United States Patent [19]

Takahashi

[11] Patent Number: 5,005,133
[45] Date of Patent: Apr. 2, 1991

[54] SYSTEM AND METHOD FOR AUTOMATICALLY CONTROLLING A VEHICLE SPEED TO A DESIRED CRUISING SPEED

[75] Inventor: Hiroshi Takahashi, Tokyo, Japan

[73] Assignee: Nissan Motor Company, Limited, Yokohama, Japan

[21] Appl. No.: 143,092

[22] Filed: Jan. 12, 1988

[30] Foreign Application Priority Data

Jan. 12, 1987 [JP] Japan .................................. 62-3299
Jan. 14, 1987 [JP] Japan .................................. 62-5000

[51] Int. Cl.$^5$ ................................................ B60K 31/00
[52] U.S. Cl. ................................. 364/426.04; 180/170
[58] Field of Search ........... 364/426.04, 424.1, 431.07; 74/866; 123/352; 180/170, 176, 179

[56] References Cited

U.S. PATENT DOCUMENTS

| 4,560,024 | 12/1985 | Noda et al. ........................... 123/352 |
| 4,591,986 | 5/1986 | Nakajima et al. .............. 364/431.07 |
| 4,598,370 | 7/1986 | Nakajima et al. .............. 364/431.07 |
| 4,723,213 | 2/1988 | Kawata et al. ...................... 180/176 |
| 4,725,969 | 2/1988 | Onogi et al. ......................... 180/179 |
| 4,809,175 | 2/1989 | Hosaka et al. ...................... 180/170 |

FOREIGN PATENT DOCUMENTS 60-4428 1/1985 Japan .
61-39636 3/1986 Japan .

OTHER PUBLICATIONS

Maeda et al., "A Design of Learning-Fuzzy Logic Controller", Kyushi Institute of Technology.
Maeada et al., "The Designs of Fuzzy Logic Controller", May 31, 1983.
Maeda et al., "Vehicle Speed Control Using Fuzzy Logic Controller", Aug. 24-26, at Yokohama.

Primary Examiner—Gary Chin
Attorney, Agent, or Firm—Foley & Lardner, Schwartz, Jeffery, Schwaab, Mack, Blumenthal & Evans

[57] ABSTRACT

An improved system and method for automatically controlling a vehicle speed to a desired cruising speed are disclosed in which a vehicle speed is detected, a target vehicle cruising speed is set on the basis of a vehicle driver's intention, a driving characteristic of a vehicular system is derived, a membership function in a fuzzy estimation is set according to the derived driving characteristic, and the fuzzy estimation is carried out using the membership function to set a controlled variable of an actuator of an engine output, the actuator controlling the engine output using the set controlled variable, with the detected vehicle speed and set target cruising speed as input information. The driving characteristic includes an operating state of a vehicular transmission connected to the engine output in a first preferred embodiment. In a second preferred embodiment, the driving characteristic includes the target cruising speed and the vehicle speed at a time of start of a resume operation in which the vehicle speed is returned to the originally set cruising speed after a cancellation of operation of the automatic cruising speed controlling system.

34 Claims, 16 Drawing Sheets

FIG.8

| ΔV | ON e | | ON Δe | | ON Δ²e | |
|---|---|---|---|---|---|---|
| | IN a₁ | OUT b₁ | IN a₂ | OUT b₂ | IN a₃ | OUT b₃ |
| 5 | 5 | 150 | 1.0 | 150 | 3.0 | 150 |
| 10 | 10 | 150 | 1.2 | 150 | 3.6 | 150 |
| 15 | 15 | 150 | 1.2 | 150 | 3.6 | 150 |
| 20 | 20 | 150 | 1.5 | 150 | 4.5 | 150 |
| 25 | 25 | 150 | 1.5 | 150 | 4.5 | 150 |
| 30 | 30 | 150 | 1.6 | 150 | 4.8 | 150 |

FIG.16 (a)
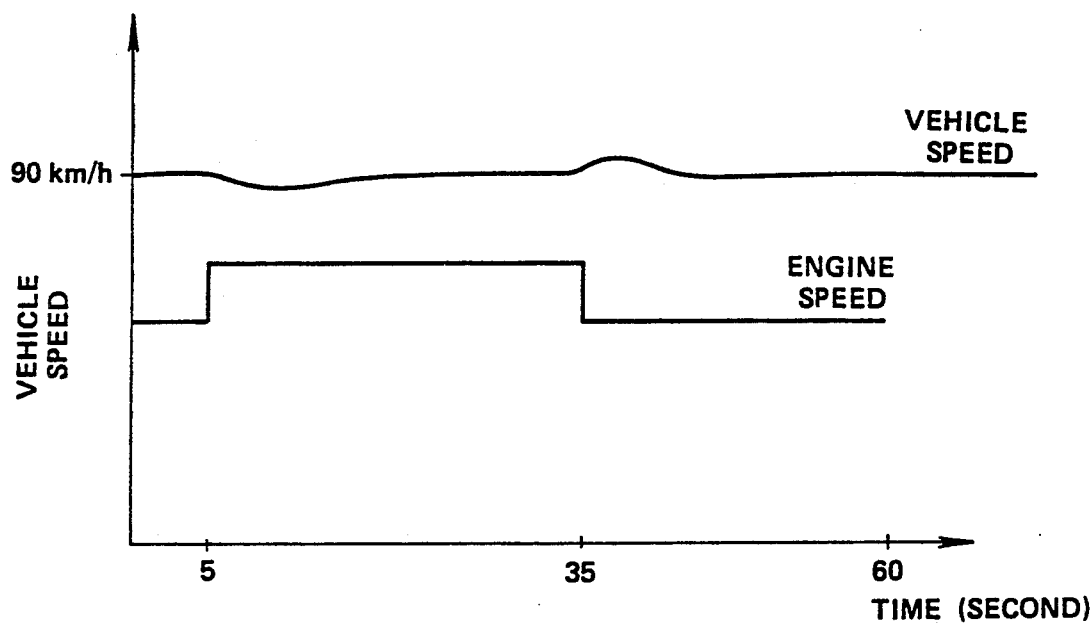
FIG.16 (b)
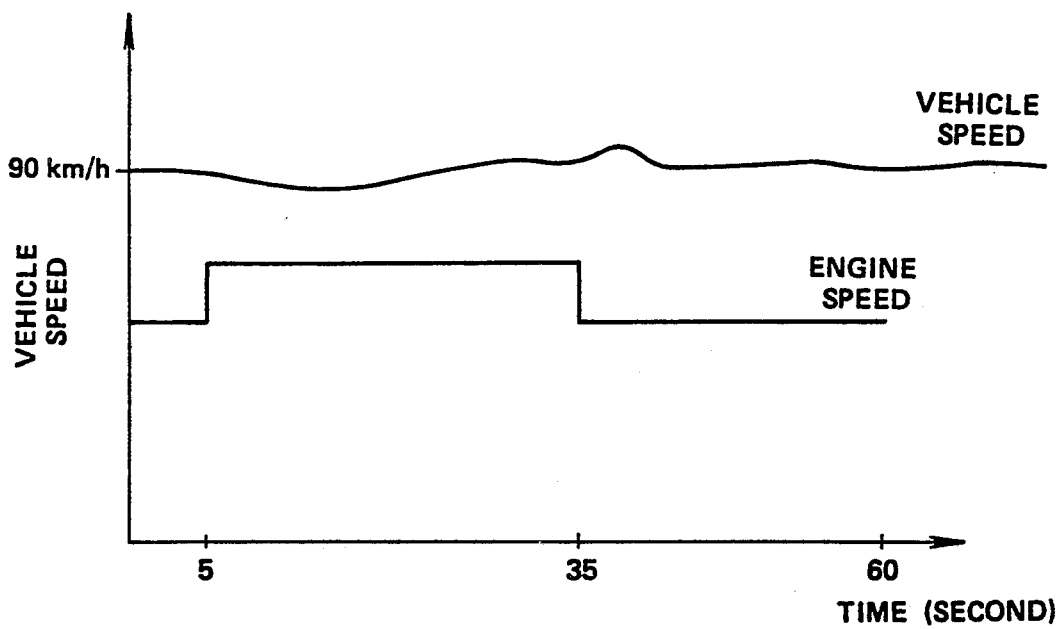
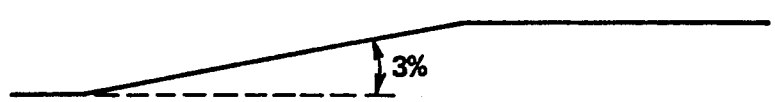

SYSTEM AND METHOD FOR AUTOMATICALLY CONTROLLING A VEHICLE SPEED TO A DESIRED CRUISING SPEED

BACKGROUND OF THE INVENTION (1) Field of the Invention

The present invention relates to an improved system and method for automatically controlling a vehicle speed to a desired cruising speed applicable to vehicles.

(2) Background of the Art

A Japanese Patent Application First Publication (Tokkai) sho 60-4428 published on Jan. 10, 1985 and Japanese Utility Model Application First Publication (Zikkai) sho 61-39636 published on Mar. 13, 1986 exemplify systems for automatically controlling vehicle speeds to desired cruising speeds in which a vehicle speed is detected by means of a vehicle speed sensor, the detected vehicle speed is compared with a target vehicle speed set on the basis of a driver's decision, deviations as the result of comparison (a control deviation, first-order difference and second-order difference) are calculated, control variable is set by substituting the values of deviations into a control calculation equation, an actuator is activated on the basis of the result of a calculated equation to adjust an opening angle of an engine throttle valve, so that the vehicular engine output is adjusted to cruise the vehicle at the desired target speed.

In addition, the vehicle speed is stored into a memory at a time when the cruising speed run by the above-described system is released. Then, when the driver resumes the cruising speed run by the system, the resume operation of the system causes the vehicle to run at the stored vehicle speed.

Furthermore, such a method has been proposed to provide a more precise cruise control over the vehicle speed by professor Murakami of Kyushu Kogyo University that a fuzzy estimation is applied to the above-described system in which the control variable is set according to respective membership functions corresponding to the deviation control, first order difference, and second order difference.

However, in the above-identified Japanese Patent and Utility Model application publications, the automatic vehicle cruising speed controlling systems set the control variable only on the basis of the arithmetically operated values derived from the vehicle speed.

In addition, the input information is limited to the vehicle speed information including the control deviation, first-order difference, and second-order difference in the proposed method of fussy estimation described above.

Furthermore, since the membership function to make an input quantity or output quantity correspond to fuzzy quantity is defined, in a.,univalent correspondence, a mismatch occurs between the fuzzy quantities and control gains of the automatic cruising speed controlling system due to changes in running characteristics of the vehicle system, for example, when an automatic transmission mounted in the vehicle so as to connect to the engine output is locked-up, released or shifted down during the running on a ascending slope or descending slope.

Consequently, overshooting or undershooting to the target value of the vehicle speed occurs, control accuracy is deteriorated, and an abrupt change in the opening angle of the throttle valve occurs. Then, the comfortability of the vehicle becomes worse.

On the other hand, during the resume operation by the system to which the fuzzy estimation is applied, the same membership function is used to carry out the fuzzy estimation to set the control variable. The following problem occurs. That is to say, for example, when the vehicle speed difference is 10 Km/h as in the case where the speed ranges from 50 Km/h to 100 Km/h the change rate (acceleration) during the resume operation is largely different from the case where the difference is 50 Km/h as in a case where 50 Km/h to 100 Km/h. In the case of the small speed difference and small acceleration, a time for which the vehicle speed returns to the stored target vehicle speed is believed to be long. Whereas in the case of the large speed difference and large acceleration, the returning time is believed to be short.

In this case, the comfortability of the vehicle again becomes worsened.

SUMMARY OF THE INVENTION

It is an object of the present invention to provide a system and method for automatically controlling a vehicle speed to a desired cruising speed which assures an improvement of vehicle comfortability.

It is another object of the present invention to provide a system and method for automatically controlling the vehicle speed to the desired cruising speed in which the fuzzy estimation is applied to the calculation of control variable for the vehicle cruising speed control, a series of memebership functions is varied according to a target speed set by the driver to which the vehicle speed is returned at the time of start of the start of the resume operation to achieve a stable acceleration.

It is still another object of the present invention to provide a system and method for automatically controlling the vehicle speed to the desired vehicle speed in which the fuzzy estimation is applied to the calculation of the control variable, and the input information of the fuzzy estimation includes information on a state in which a gear position and lock-up state of a vehicular automatic transmission is shifted in addition to a vehicle speed information so that an optimum fuzzy estimation is achieved.

The above-described objects can be achieved by providing a system for automatically controlling a vehicle speed to a desired vehicle cruising speed, comprising: (a) first unit for detecting the vehicle speed; (b) second unit for setting a target cruising vehicle speed according to a vehicle driver's intention; (c) third unit for controlling an engine output of the vehicle using a controlled variable so that the vehicle speed coincides the target cruising vehicle speed; (d) fourth unit for setting a variable series of membership functions in a fuzzy estimation; and (e) fifth unit for carrying out the fuzzy estimation using the variable series of membership functions set by the fourth unit to set the controlled variable of the third unit, with the target vehicle cruising speed set by the second unit and vehicle speed detected by the first unit as input information thereof.

The above-described objects can also be achieved by providing a system for automatically controlling a vehicle speed to a desired cruising speed, comprising: (a) first unit for detecting the vehicle speed; (b) second unit for setting a target cruising speed on the basis of a vehicle driver's intention; (c) third unit for controlling an engine output using a controlled variable so that the vehicle speed detected by the first unit coincides, with the target vehicle cruising speed; (d) fourth unit for deriving a driving, characteristic of a vehicular system; (e) fifth unit for selecting and setting a membership function from among a plurality of different membership functions in a fuzzy estimation on the basis of the derived driving characteristic of the vehicular system; and (f) sixth unit for carrying out the fuzzy estimation using the membership function set by the fifth unit to set the controlled variable of the third unit, with the target vehicle cruising speed set by the second unit and vehicle speed detected by the first unit as input information thereof.

The above-described objects can also be achieved by providing a system for automatically controlling a vehicle speed to a desired cruising speed, comprising: (a) first unit for detecting the vehicle speed; (b) second unit for setting a target vehicle cruising speed according to a vehicle driver's intention; (c) third unit for controlling an engine output using a controlled variable on the basis of a manipulated variable so that the vehicle speed detected by the first unit coincides with the target cruising speed: (d) fourth unit for deriving a driving characteristic of a vehicular system; (e) fifth unit for setting a membership function in a fuzzy estimation, the membership function being varied on the basis of the driving characteristic of the vehicular system derived by the fourth unit; and (f) sixth unit for carrying out the fuzzy estimation using the membership function set by the fifth unit to set the controlled variable of the third unit, with the target cruising vehicle speed set by the second unit and vehicle speed detected by the first unit being as input information thereof.

The above-described objects can also be achieved by providing a method for automatically controlling a vehicle speed to a desired vehicle cruising speed, comprising the steps of: (a) detecting the vehicle speed; (b) setting the vehicle speed to a target cruising speed on the basis of a vehicle driver's intention; (c) deriving a driving characteristic of a vehicular system; (d) setting a membership function in a fuzzy estimation on the basis of the derived driving characteristic of the vehicular system; (e) carrying out the fuzzy estimation using the set membership function to set a controlled variable, with the detected vehicle speed and set target cruising speed as input information in the step thereof; and (f) controlling an engine output using the set controlled variable so that the vehicle speed coincides with the target vehicle cruising speed.

BRIEF DESCRIPTION OF THE DRAWINGS

FIG. 8 is a table of parameters on the input side membership function shown in FIG. 6(a).

FIG. 16(a) is a timing chart of the vehicle speed and engine speed during the cruising speed control carried out in the second preferred embodiment.

FIG. 16(b) is a timing chart of the vehicle speed and engine speed during the cruising speed control with the membership functions fixed.

DETAILED DESCRIPTION OF THE PREFERRED EMBODIMENTS

Reference will hereinafter be made to the drawings in order to facilitate understanding of the present invention.

Figure 1:
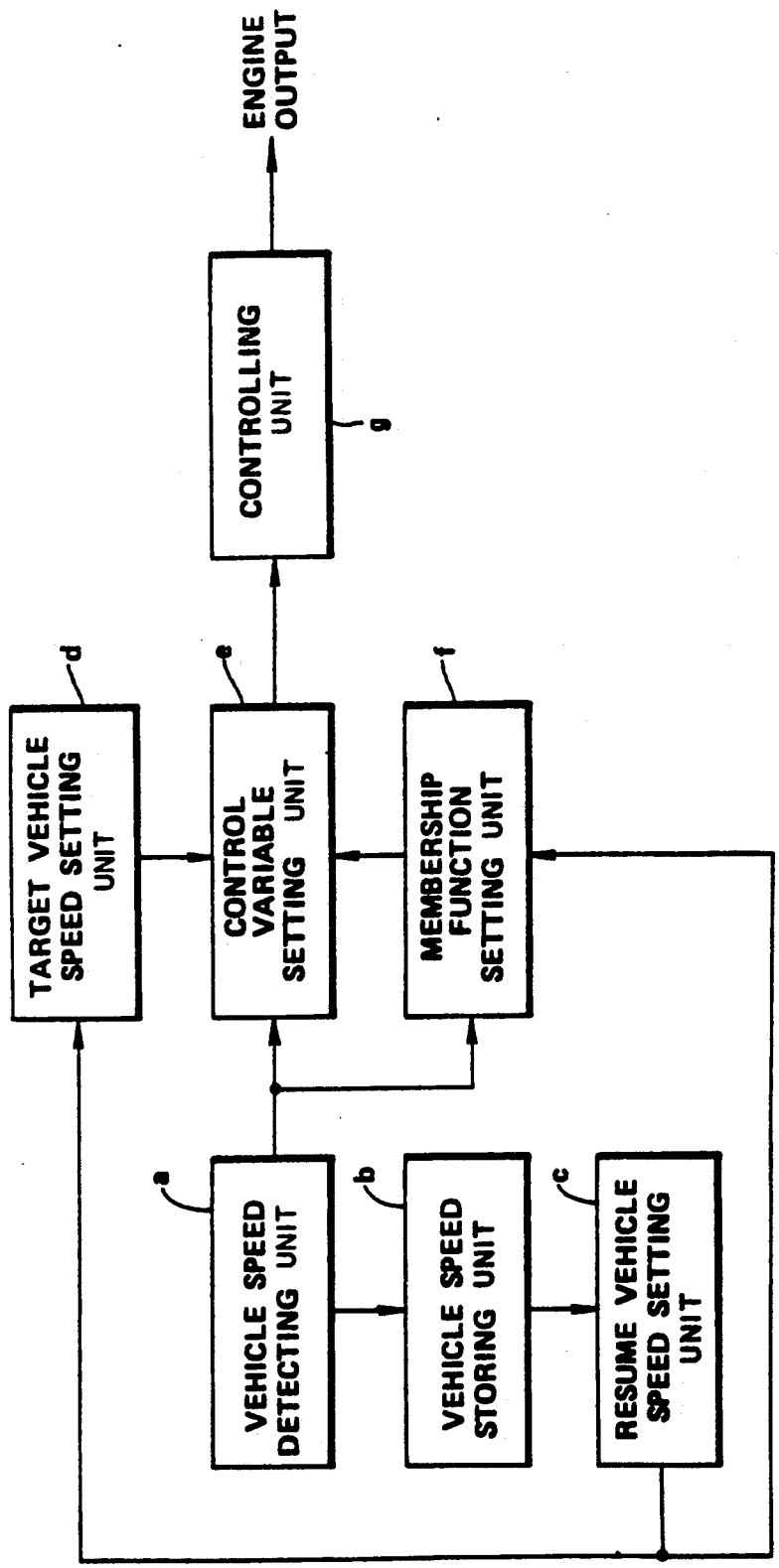
FIG. 1 is a functional block diagram of a system for automatically controlling a vehicle speed to a desired cruising speed according to the present invention for explaining a general concept of a first preferred embodiment.

FIG. 1 shows a general function of a system for automatically controlling a vehicle speed to a desired vehicle cruising speed in a first preferred embodiment.

In FIG. 1, the automatic cruising speed controlling system in the first preferred embodiment includes: unit a for detecting a vehicle speed; unit d for setting a target vehicle speed according to a driver's own decision; unit b for storing the vehicle speed during driving of the vehicle under a predetermined driving condition; unit c for setting the vehicle speed stored in the vehicle speed storing unit to the target vehicle speed upon a start of a resume operation; unit g for controlling an engine output so as to make the vehicle speed detected by the vehicle speed, detecting unit equal to the target vehicle speed; unit f for setting membership functions in a fuzzy estimation on the basis of the target vehicle speed set by the resume vehicle speed setting unit and vehicle speed during the start of the resume operation; and unit e for setting control variables of the control unit through the fuzzy estimation using the membership functions set by the membership function setting unit with the target ,vehicle speed set by the target vehicle speed setting unit and vehicle speed detected by the vehicle speed detecting unit as input information.

Then, when the vehicle speed stored in the vehicle speed storing unit b by the resume vehicle speed setting unit c during the resume operation is set as the target vehicle speed, membership functions are set on the basis of the detected vehicle speed by unit of the vehicle speed detecting unit a during the start of resume operation and the target speed set by the resume target speed setting unit c.

The control variable setting unit e calculates control deviation, first-order difference, and second-order difference by comparing the detected vehicle speed with the target vehicle speed and uses the calculated values and set membership functions to set the control variables of the controlling unit g through the fuzzy estimation.

Thus, the controlling unit g operates according to the set control variables so that the engine output is controlled.

It is noted that the membership functions are set, e.g., so as to correspond to the deviation between the target vehicle speed at the time of the resume operation and vehicle speed during the start of resume operation, a stable acceleration can be achieved irrespective of magnitude of the deviation and driveability can be improved.

Figure 2:
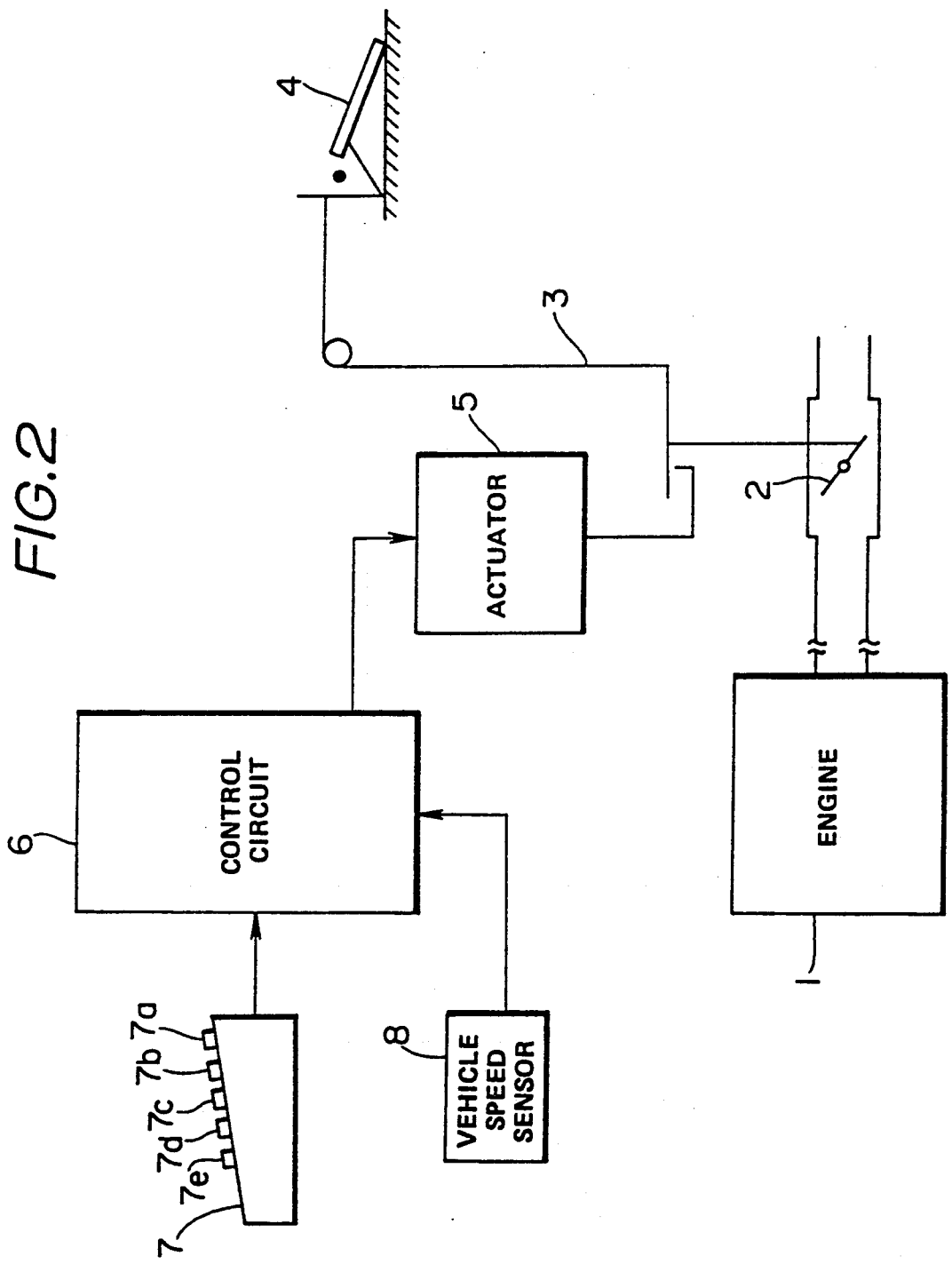
FIG. 2 is a simplified circuit block diagram of the automatic cruising speed controlling system in the first preferred embodiment shown in FIG. 1.

FIG. 2 shows a specific system configuration of the automatic cruising speed controlling system in the first preferred embodiment.

In FIG. 2, an engine 1 mounted in the vehicle is provided with a throttle valve 2, an opening angle of which is controlled by unit of an accelerator pedal 4 linked via an acceleration link 3.

Furthermore, the throttle valve 2 is linked with an actuator 5 to drive the throttle valve 2 independently of an operation of the accelerator pedal 4. The detailed construction of the actuator 5 will be described later with reference to FIG. 3.

Next, the actuators is connected with a control circuit 6 including a microcomputer, i.e., a CPU (Central Processing Unit), ROM (Read Only Memory), RAM (Random Access Memory), and I/O (Input/Output Unit).

A series of arithmetic operations such as described below is carried out to control a pressure supply valve and air valve in the actuator 5.

An operation panel 7 is installed, e.g., on an instrument panel adjacent to a driver's seat and is connected to the control circuit 6. The operation panel 7 includes a set switch 7a, a resume switch 7b, an acceleration switch 7c, a cancel switch 7d, and brake switch 7e, these switches being operable by the driver. That is to say, the operation panel 7 includes the target vehicle speed setting unit d and resume vehicle speed setting unit c shown in FIG. 1.

It is noted that the operation of the automatic cruising speed controlling system may be canceled by the operation of the cancel switch 7d or brake switch 7e, or alternatively, an operation of a brake pedal of the vehicle or neutral or parking position by the driver.

In addition, a vehicle speed sensor 8 is connected to the control circuit 6 to detect the instantaneous vehicle speed v and inform the control circuit 6 of the vehicle speed.

Figure 3:
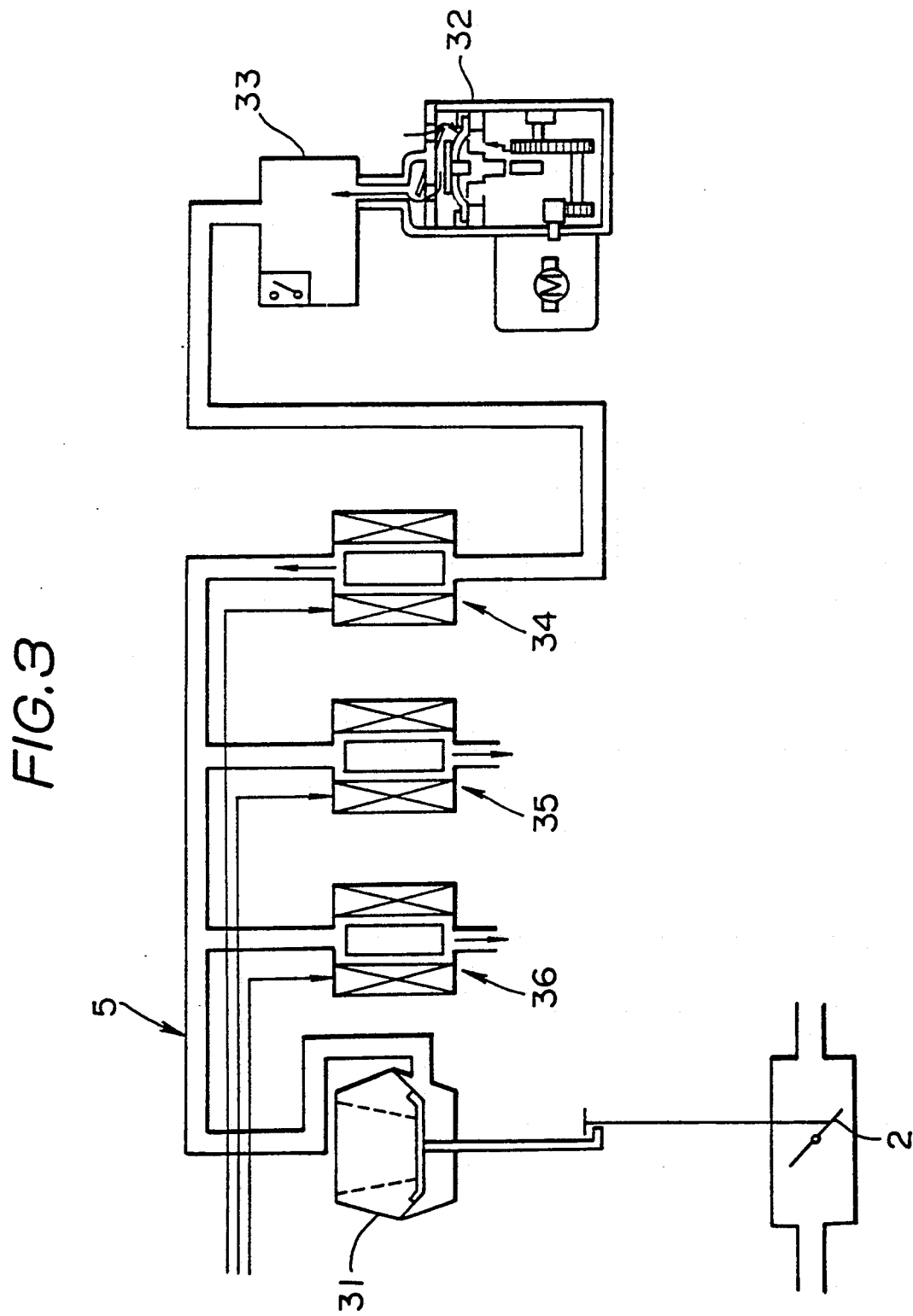
FIG. 3 is a simplified connection diagram of a throttle valve actuator section of the automatic cruising speed controlling system shown in FIGS. 1 and 2.

FIG. 3 shows a specific configuration of the actuator 5 shown in FIG. 2.

The actuator 5 includes a diaphragm 31 arranged so as to enable actuation of the throttle valve 2. The diaphragm 31 receives pressurized air derived from an electrically operated air pump 32 via an air tank 33 and via a supply valve 34. An air valve 35 and release valve 36 are provided at a downstream of the supply valve 34 for enabling the opening of the diaphragm 31 to the atmosphere.

When the supply valve 34 is closed, the air valve 35 and release valve 36 are opened during no operation of the automatic cruising speed controlling system, an internal part of the diaphragm 31 is exposed to the air pressure so that the diaphragm 31 is in non-operative state. On the other hand, when the automatic cruising speed control operation is carried out, the release valve 36 is closed and pressure applied to the diaphragm 31 is controlled according to open and close operations of the supply valve 34 and air valve 35 so that the opening angle of the throttle valve 2 is adjusted.

Figure 4:
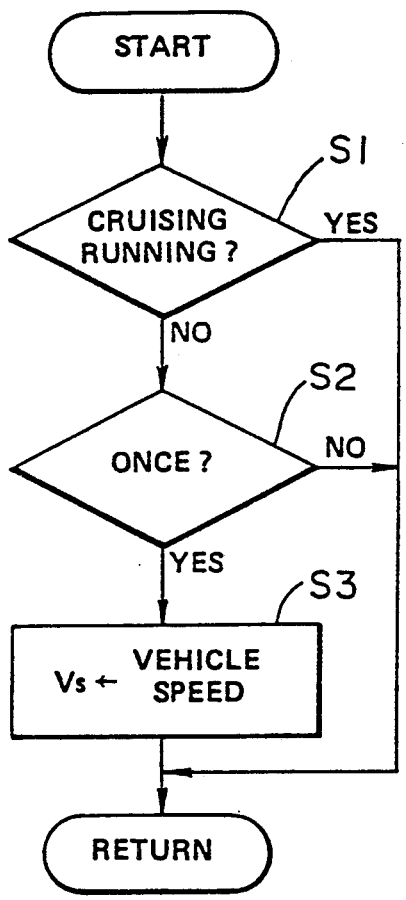
FIG. 4 is an operational flowchart indicating vehicle speed storage routine executed in the first preferred embodiment shown in FIGS. 1 to 3.

FIG. 4 shows a processing routine on which the control circuit 6 is executed to store the vehicle speed upon start of release for the automatic cruising speed control operation.

In a step S1, the CPU determines whether the system carries out the cruising speed control operation. If not operational, the routine goes to a step S2 in which the CPU determines whether the cruising speed control has been released, i.e., a first determination of the release of the automatic cruising speed control. If this is the first determination of the release, the routine goes to a step S3 to store the read value of the vehicle speed from the vehicle speed sensor 8 as the target vehicle speed Vs.

Figure 5:
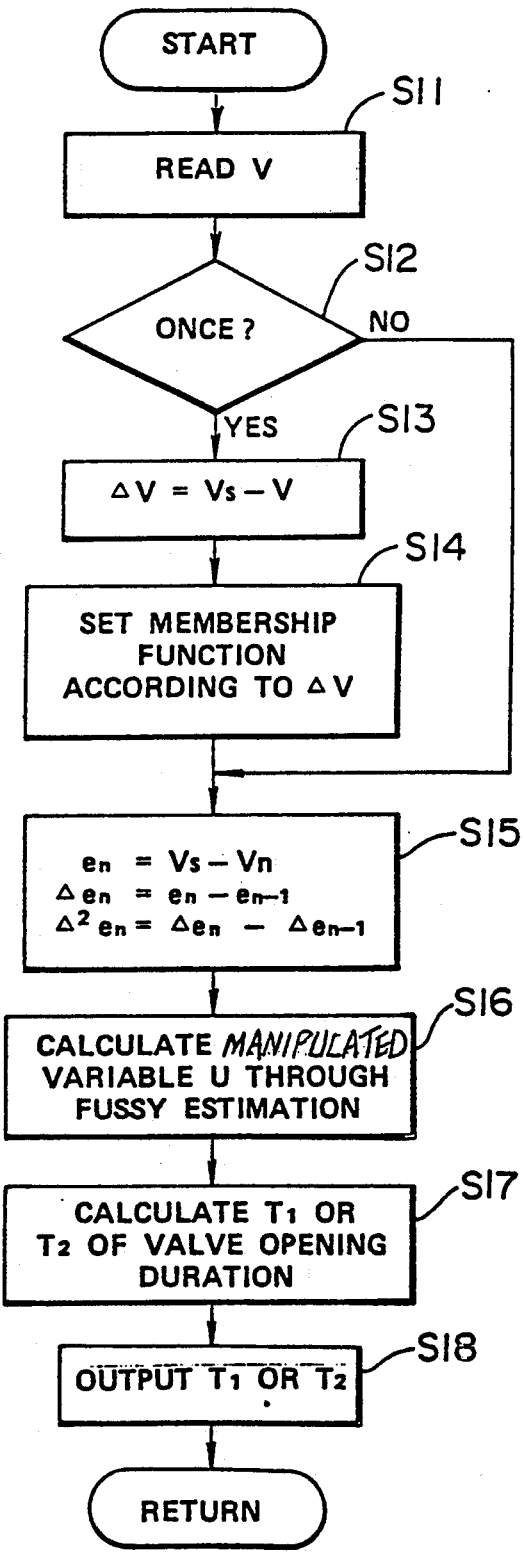
FIG. 5 is a vehicle speed control routine executed during a resume operation in the first preferred embodiment shown in FIGS. 1 to 4.

FIG. 5 shows a processing routine executed in the control circuit 6 to control the vehicle speed during the resume operation.

The routine shown in FIG. 5 is started upon confirmation of ON operation of the resume switch 7b on the operation panel 7.

In a step S11, the CPU reads the vehicle speed V from the vehicle speed sensor 8.

In a step S12, the CPU determines whether this is a first time to carry out the resume operation.

If this is the first time (yes), the routine goes to a step 13 in which the CPU calculates a vehicle speed deviation of $\Delta v$ ($=Vs-v$) between the vehicle speed v during the resume operation start read in the step S11 and the target vehicle speed Vs set in the routine shown in FIG. 4.

An input-side membership function is set according to a magnitude of the deviation of $\Delta v$ calculated in the step S13. Specifically, the input-side membership function is set by selecting an optimum parameter from a table map storing parameters ai of the membership functions with an integer value of $\Delta v$ derived from a correct rounding of deviation $\Delta v$ multiplied by 1/5 specified as an address. The output-side membership function, then, uses a linear function expressed as $\frac{1}{2}$ (bi)(y), wherein a parameter bi uses the same value irrespective of the vehicle speed deviation, control deviation, first-order difference, and second-order difference.

The steps S11 to S14 correspond to the membership function setting unit f.

In the next step S15, the CPU calculates the control deviation $e_n$ ($=Vs-v$), first-order difference value $\Delta e_n$ ($=e_n-e_{n1}$), and second-order difference value $\Delta^2 e_n$ ($=\Delta e_n - \Delta e_{n-1}$) from the periodically detected vehicle speed v and the target vehicle speed Vs.

In a step S16, the fuzzy estimation is carried out using the membership functions set in the step S14 so that an manipulated variable U of the actuator 5 (supply valve 34 or air valve 35) is calculated.

In a step S17, an opening duration T1 of the supply valve 34 or opening duration T2 of the air valve 35 is set depending on whether the manipulated variable U takes either a negative or positive value and depending on whether either of the supply valve 34 or air valve 35 is currently operating.

The steps S16 and S17 correspond to the control variable setting unit e.

In a step S18, the control circuit 6 outputs the control signal to either the supply valve 34 or air valve 35 to open either of the valves for the duration of T1 or T2 set in the step S17.

The step S18 corresponds to the controlling unit g.

Next, the fuzzy estimation will be described below which is carried out in the step S16.

When the respective values are positive for the control deviation $e_n$ (hereinafter referred to as $e_1$), first-order difference $\Delta e_n$ (hereinafter referred to as $e_2$), and second-order difference $\Delta^2 e_n$ hereinafter referred to as $e_3$), the input-side membership function empirically indicating a certainty (fuzzy quantity) of a proposition $Ii(i=1$ to 3) that the manipulated variable U should be positive is set in the following equation (refer to a solid line of FIG. 6(a)).

$$Pi(ei) = 1/\pi \operatorname{Tan}^{-1}(Ciei) + 0.5 \quad (1)$$

On the other hand, when the respective values of $e_1$, $e_2$, and $e_3$ are negative, the input side membership indicating the certainty of proposition IIi ($i=1$ to 3) that the manipulated variable U should be negative when the respective values of $e_1$, $e_2$, and $e_3$ are negative is set in the following equation (refer to a broken line of FIG. 6(a).

$$Ni(ei) = 1/\pi \operatorname{Tan}^{-1}(-Ciei) + 0.5 \quad (2)$$

On the other hand, the output-side membership function corresponding to the certainty that the manipulated variable U should be positive and corresponding to the manipulated variable U is set, e.g., in the following equation. (Refer to the solid line of FIG. 6(b))

$$Pui(U) = diU + 0.5 \quad (3)$$

The output-side membership function is set in the following function which corresponds to the proposition IIi (Refer to a broken line of FIG. 6(b)).

$$Nui(U) = -diU + 0.5 \quad (4)$$

Suppose that a truth value of a value of the output-side membership function for the input side membership function is $\gamma$. The following equations are established for propositions Ii and IIi.

$$Pi(ei) + \gamma - 1 = Pui(U) \quad (5)$$

$$Ni(ei) + \gamma - 1 = Nui(U) \quad (6)$$

It is noted that as the truth value $\gamma$ becomes large, the control effect is large for the propositions.

Then, the truth value $\gamma$ of the propositions that the manipulated variable U (unknown) at the time of the input variable $e_i$ (known) is taken as a longitudinal axis and manipulated variable U is taken as a lateral axis. Thereafter, for each proposition the drawings are carried out as shown in FIG. 7.

Favorable manipulated variables U are represented for the corresponding propositions as the value of $\gamma$ approaches 1. As a method for selecting the optimum manipulated variable U, each manipulated variable at an intersection of each graph can be selected.

Figure 7:
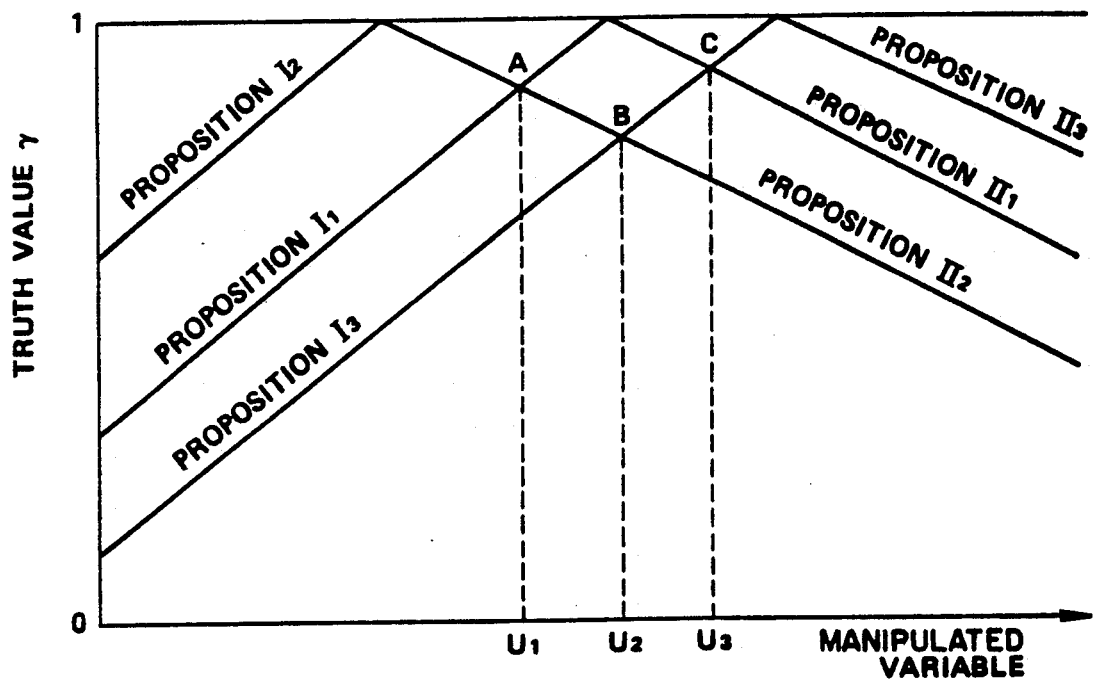
FIG. 7 is a graph used to set operating variables through a fuzzy estimation carried out in the preferred embodiments.

In FIG. 7, the intersection A satisfies the proposition $I_1$ and proposition $II_2$ with the same truth value $\gamma$. That is to say, the optimum manipulated variable $U_1$ is achieved with the control deviation $e_1$ and first-order difference $e_2$ taken into consideration.

Similarly, the intersection B can be said to be the optimum value $U_2$ on the basis of the first-order difference and second-order difference and intersection C can be said to be the optimum value $U_3$ on the basis of the control deviation and second-order difference.

The three manipulated variables $U_1$, $U_2$, and $U_3$ thus obtained are candidates of the optimum operating variable. The manipulated variable to be outputted from these candidate manipulated variables are determined. The method for this determination may include an average value of the three values, a weight mean value for each value, or mode or median of a set for each value. In this embodiment, however, an intermediate value ($U_2$ in FIG. 7 ) of the three values is selected.

It is noted that although the above-described technique is one example of the fuzzy estimation and is called an indirect method, another method called a direct method may be used in which the fuzzy quantity derived in the input-side membership function is multiplied by the output-side membership function in which the output variable is directly set for the input variable.

Next, a specific example and function of the system in which the membership function is set according to the vehicle speed deviation $\Delta V$ during the resume operation will be described below.

The parameter ai of the input-side membership function described in the step S14 is set as $ai=2\pi/Ci$ for Ci in the equations (1) and (2) shown in the above-described fuzzy estimation. Then, the parameter bi of the output-side membership function is set as bi=½di for di of the equations of (3) and (4).

Figure 6A:
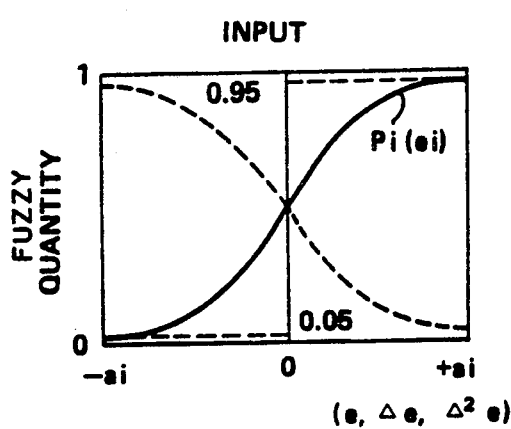
FIGS. 6(a) and 6(b) are graphs indicating input-side and output-side membership functions stored in the same memory in the first preferred embodiment shown in FIGS. 1 to 5.
Figure 6B:
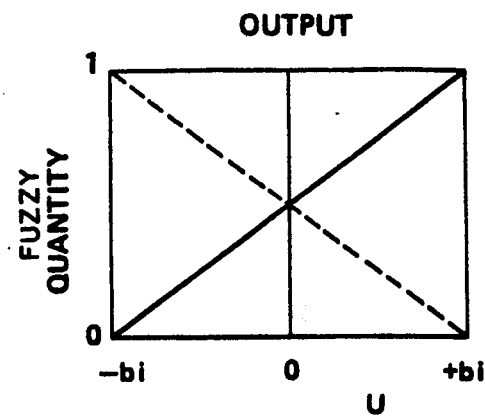

In this case, the parameters ai and bi correspond to input variable and output variable providing the maximum and minimum values of the fuzzy quantity in the input-side and output-side membership functions, as shown in FIGS. 6(a) and 6(b). As the parameter ai (absolute value) is large, the fuzzy quantity, i.e., gain becomes small for the same input variable and as the parameter bi becomes large, the gain becomes large.

It is noted that in the first preferred embodiment the parameter bi is constant.

Therefore, the parameter a1 which corresponds to the control deviation $e_1$ is set in proportion to the vehicle speed deviation $\Delta V$. For example, when $\Delta V = 20$ [km/h], a1 = 20. When $\Delta V$ is 40, a1 = 40. This is because the parameter a1 is equivalent to the gain of an integral element in a so called PID (Proportion, Integration, and Differential) control.

Next, the parameter $a_2$ corresponding to the first-order difference value $e_2$ of the control difference $e_1$ becomes relatively large even if the vehicle speed deviation $\Delta V$ is small so as to make the settling time short. On the other hand, if the $\Delta V$ is large, i.e., the vehicle speed deviation ranges from 40 to 50 km/h, the parameter $a_2$ is made small so that the abrupt acceleration is suppressed. This is because the parameter $a_2$ is equivalent to the gain of the proportional element in the PID control.

In addition, the parameter $a_3$ which corresponds to the second-order difference value $e_3$ of the control deviation $e_1$ may be twice or three times as large as the parameter $a_2$. In the first, preferred embodiment, the parameter $a_3$ may be set to three times as large as the parameter $a_2$. It is noted that the parameter $a_3$ is equivalent to the gain of the differential element in the PID control.

On the other hand, the parameters of $b_1, b_2$, and $b_3$ which specify the output-side membership function are fixed to the same values as described above (e.g., 150).

FIG. 8 shows part of a parameter table calculated in the above-described method.

As the vehicle speed deviation $\Delta V$ is increased, the control gain is made small so that a stable appropriate acceleration can be achieved irrespective of the value of $\Delta V$, thus improving the driveability and comfortability.

In addition, in the above-described first embodiment, the membership functions are set only by unit of the deviation $\Delta V$ between the target vehicle speed and vehicle speed at the time of the start of the resume operation. However, if the membership functions are set with the vehicle speed at the time of the start of the resume operation taken into account (change of the parameters), the acceleration can be stabilized more accurately and the driveability can be improved.

In detail, if the deviation $\Delta V$ is the same value, e.g., 20 Km/h, the resume operation carried out at the time when the $\Delta V$ is changed from 50 Km/h to 70 Km/h and that carried out at the time when the $\Delta V$ is changed from 80 Km/h to 100 Km/h are different in the vehicle characteristics at the time of initial states upon start of resume operation. Therefore, it is difficult to obtain the same control characteristics using the same membership functions. Then, if ,e.g., the engine speed in the case of 80 Km/h to 100 Km/h is higher and the gain in the vehicle system is high (the change of the vehicle speed is large with respect to the same manipulated variables), the membership function may alternatively be changed so that the gain of the control system is made small (by increasing the parameter $a_1$ larger).

In this way, the same acceleration feelings can be achieved in the vehicle speed changing cases of 50 Km/h to 70 Km/h and 80 Km/h to 100 Km/h.

In the first preferred embodiment described above, the membership functions are set on the basis of the target vehicle speed and vehicle speed at the time of start of resume operation so that the stable acceleration can always be achieved and the driveability and comfortability can be improved.

Next, the automatic cruising speed controlling system in a second preferred embodiment will be described with reference to FIGS. 9 to 18($b$).

Figure 9:
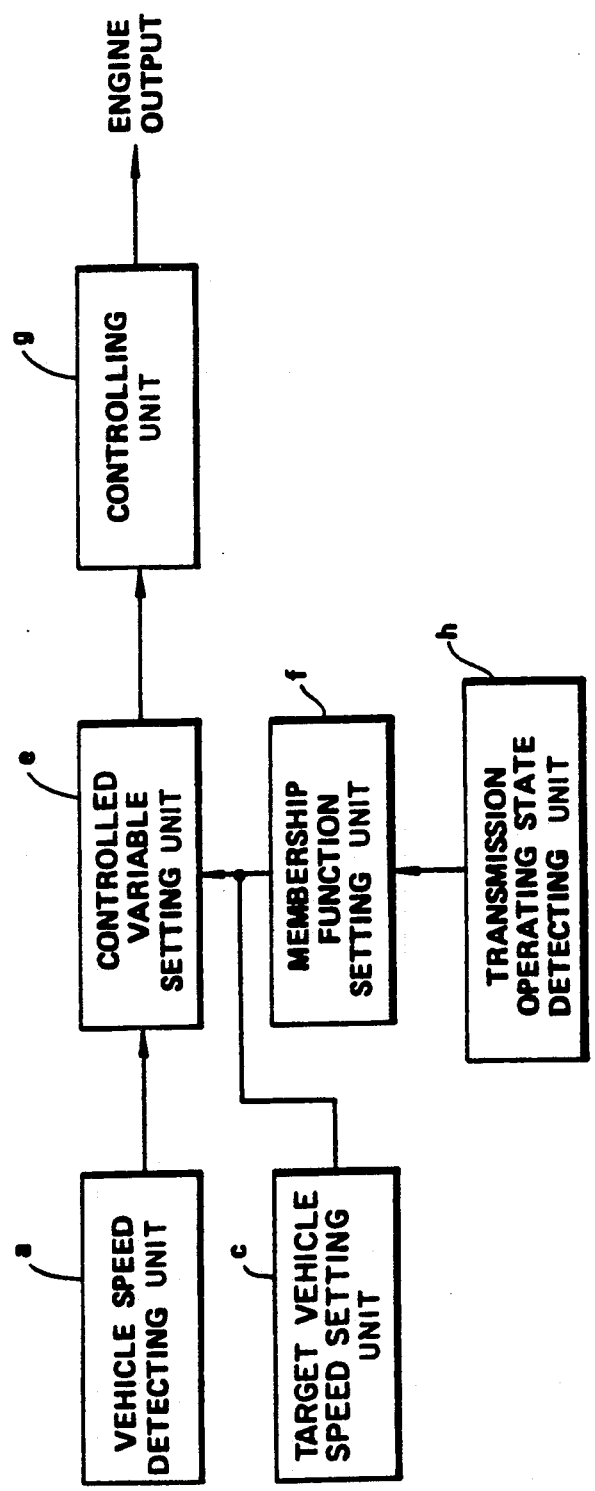
FIG. 9 is a functional block diagram of the system for automatically controlling the vehicle speed to the desired vehicle cruising speed for explaining a general concept of a second preferred embodiment

The automatic cruising speed controlling system in the second preferred embodiment includes: unit a for detecting the vehicle speed; unit g for controlling the engine output so that the detected vehicle, speed coincides with the target vehicle speed; unit h for detecting an operating state of a vehicular transmission; unit f for setting membership functions in a fuzzy estimation corresponding to the vehicular driving in the detected transmission operating state; and unit e for setting control variables of the control unit f through the fuzzy estimation using the membership functions set by the membership function setting unit f with the target vehicle speed set by the target vehicle speed setting unit c and vehicle speed detected by the vehicle speed detecting unit a, as shown in FIG. 9.

Thus, the membership functions are set corresponding to the operating states in the transmission operating states through the membership function setting unit f according to the detected transmission operating state detected, by the transmission operating state detecting unit h.

The control variable setting unit e compares the detected vehicle speed with the target vehicle speed to calculate the control deviation, first-order difference, second-order difference, and so on and set the control variables of the controlling unit g using the calculated values of the above-described differences and the set membership functions. Thus, the controlling unit g operates according to the set control variables to control the engine output.

It is noted that since the membership function is set according to the transmission operating state, a stable controllability for the vehicle speed can be achieved even if the vehicle system characteristic is changed due to the change in the transmission operating state. Thus, the driveability and comfortability can be improved.

It is also noted that the system configuration of the automatic cruising controlling system in the second preferred embodiment is substantially the same as the first preferred embodiment shown in FIG. 2.

Figure 10:
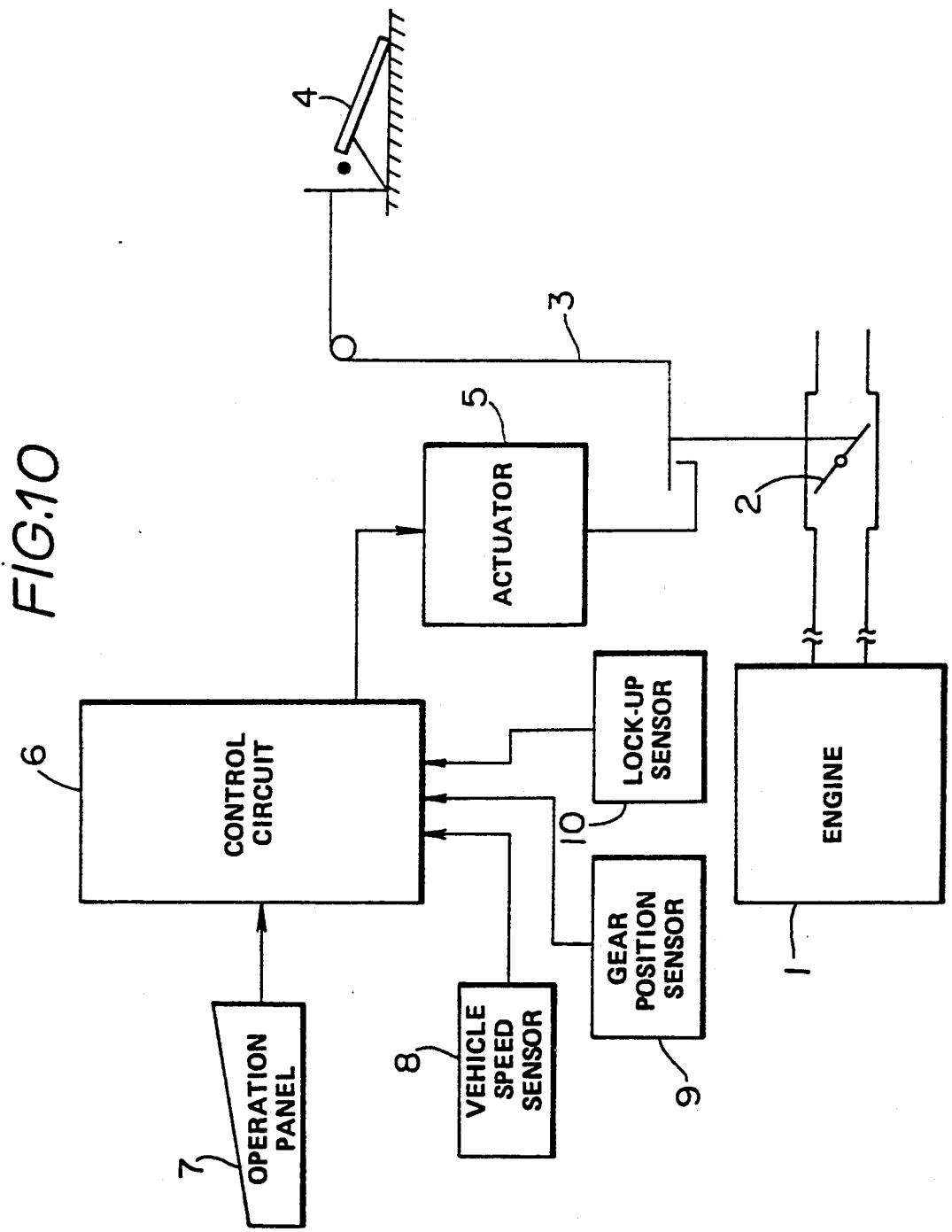
FIG. 10 is a simplified circuit block diagram of the automatic cruising speed controlling system in the second preferred embodiment shown in FIG. 9.

However, as shown in FIG. 10, a gear position sensor 9 is provided for detecting the gear position of an automatic transmission connected to the engine 1 and outputting the gear position information to the control circuit 6.

In addition, a lock-up sensor 10 is provided for detecting a lock-up state or non lock-up state of the automatic transmission and outputting the lock-up state information to the control circuit 6. The gear position sensor 9 and lock-up sensor 10 shown in FIG. 10 constitute the transmission operating state detecting unit h shown in FIG. 9.

Figure 11:
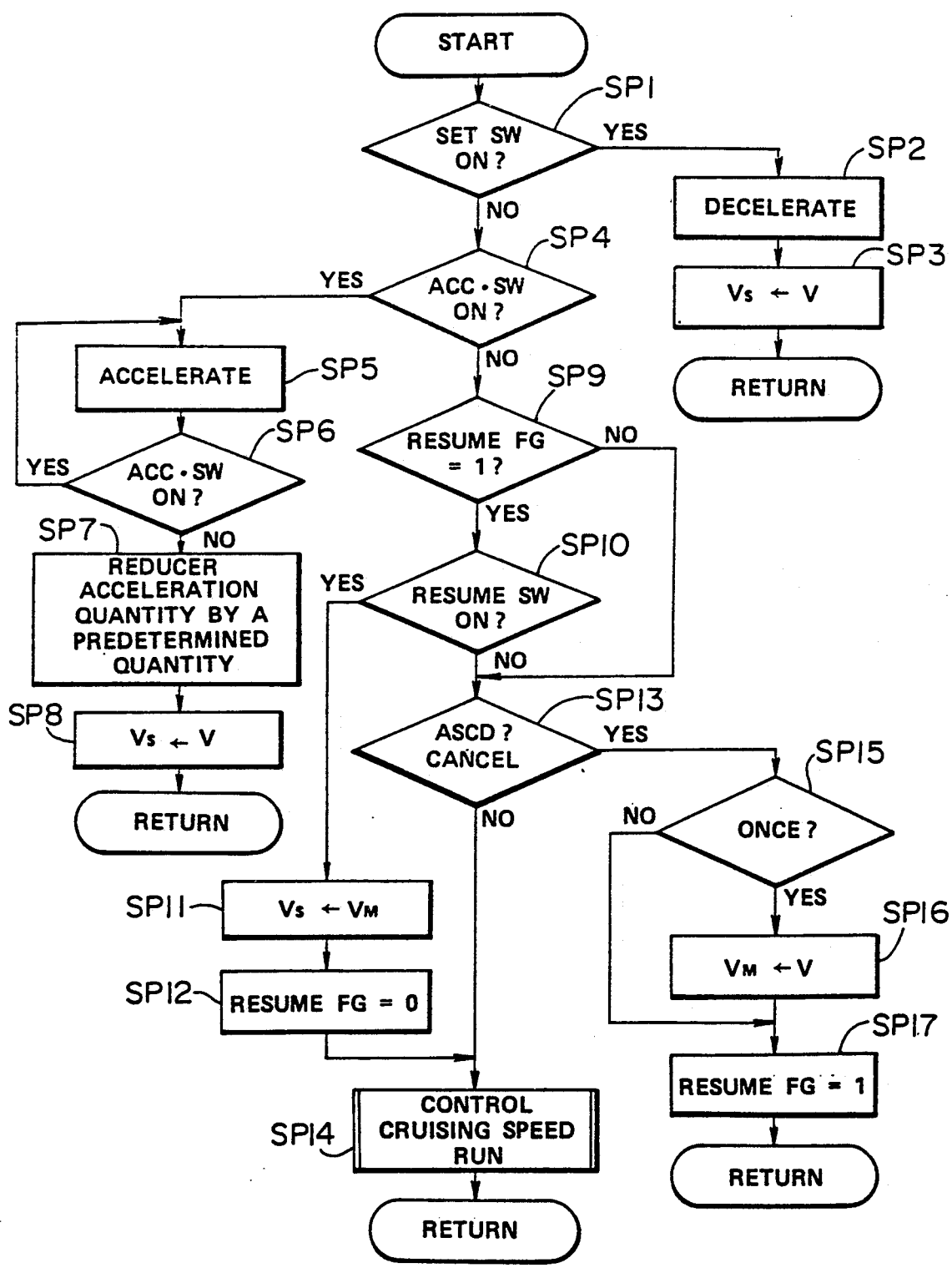
FIG. 11 is an operational flowchart of a vehicle speed control routine executed in the second preferred embodiment shown in FIGS. 9 and 10.

FIG. 11 shows a processing routine indicating the vehicle speed control routine executed by the control circuit 6 in the cruising speed control carried out via the supply valve 34 and air valve 35.

The processing routine shown in FIG. 11 is executed for each predetermined control cycle.

In a step SP1, the CPU determines whether the set switch 7a (for vehicle deceleration) has been depressed. If depressed (YES), the routine goes to a step SP2 in which the air valve 35 is opened for a predetermined duration to control the vehicle speed in a predetermined vehicle deceleration mode and the control circuit 6 sets the current vehicle speed V read from the vehicle speed sensor 8 as the target vehicle speed. While the set switch 7a is continued to be depressed, the above-described series of operations are repeated to decelerate the vehicle.

If the set switch 7a has been depressed and thereafter the driver's finger is separated from the set switch 7a, the routine goes to the step SP4 in which the CPU determines whether the accelerate switch 7c (for vehicle acceleration) is depressed. If the accelerate switch 7c has been depressed, the routine goes to a step SP5. The acceleration control is carried out by the open operation of the supply valve 34 for the predetermined duration. Thereafter, the routine goes to a step SP6 in which the CPU again determines whether the accelerate switch 7c has been operated. If the accelerate switch 7c has been operated, the routine returns to the step SP5 in which the acceleration control is repeated to accelerate the vehicle.

When the driver's finger separates from the depressed accelerate switch 7c, the routine returns to the step SP7. When the accelerate switch 7c has been depressed and the driver's finger is separated therefrom, the routine goes to a step SP7 in which the supply valve 34 is closed and the air valve 35 is opened for the predetermined duration so that the throttle valve 2 is returned slightly in a close direction. After the suppression of the vehicle speed toward the acceleration direction through the overshooting, the routine returns to a step SP8 in which the present vehicle speed V is set as the target vehicle speed Vs.

In this way, the set switch 7a is depressed to decelerate the vehicle or the accelerate switch 7c is depressed to accelerate the vehicle, so that the vehicle speed arrives at the desired vehicle speed. At this time, if the driver separates his finger from the corresponding depressed switch 7a or 7c, the vehicle speed at that time is set as the target vehicle speed $V_s$.

The routine then goes to a step SP9, in which the CPU determines whether a resume flag is set. This is because the vehicle speed at the previous cruising speed control is stored in a memory of the control circuit 6 and the cruising speed control can automatically be restarted at the thus-stored vehicle speed. The resume flag is set at the end of the previous cruising speed control run and is reset when the resume switch 7b is depressed.

When the CPU determines in the step SP9 that the resume flag has been set, the routine goes to a step SP10, in which the resume switch 7b has been depressed. If the resume switch 7b is depressed, the routine goes to a step SP11 in which the vehicle speed $V_M$ stored during the end of the previous cruising speed control run is set as the target vehicle speed $V_s$. After the reset of the resume flag in the step SP12, the cruising speed control run is carried out in a step SP14.

Then, if the above-described state is continued, the following processing routine shown in FIG. 11 goes to the step SP9 in which the CPU determines that the determination is NO (resume flag=0) and the routine goes to the step SP13 in which the cruising speed control run (ASCD) has been cancelled (including during the operation and during the cancelling). The routine goes to a step SP14 in which the cruising speed run control is continued with the vehicle speed $V_M$ being the target vehicle speed.

On the other hand, when the resume switch 7b is not depressed, the determination in the step SP10 is NO and the routine goes to a step SP13. During the cruising speed control run, the routine goes to the step SP14 in which the cruising speed control run is continued at the target vehicle speed $V_S$ set in the step SP3 or step SP8.

When the CPU determines that the cruising speed run control has been cancelled in the step SP13, the routine goes to a step SP15. In that step, the CPU determines whether the cancelling is carried out once or more. If this is the first time to carry out the cancelling, the routine goes to a step SP16 in which the vehicle speed V at that time is stored as $V_M$. Then the routine goes to a step SP17 in which the resume flag is set. After the second cancellation, the routine goes from the step SP15 to the step SP17. The vehicle speed $V_M$ stored in the step SP16 is set as the target vehicle speed when the resume switch 7c has been depressed at the next time.

In this way, the target vehicle speed in the case of carrying out the cruising speed running control in the step SP14 is set according to the intention of the driver. That is to say, various switches for the cruising speed control run installed on the operation panel 7 and software function for the target vehicle speed setting correspond to the target vehicle speed setting unit.

Figure 12:
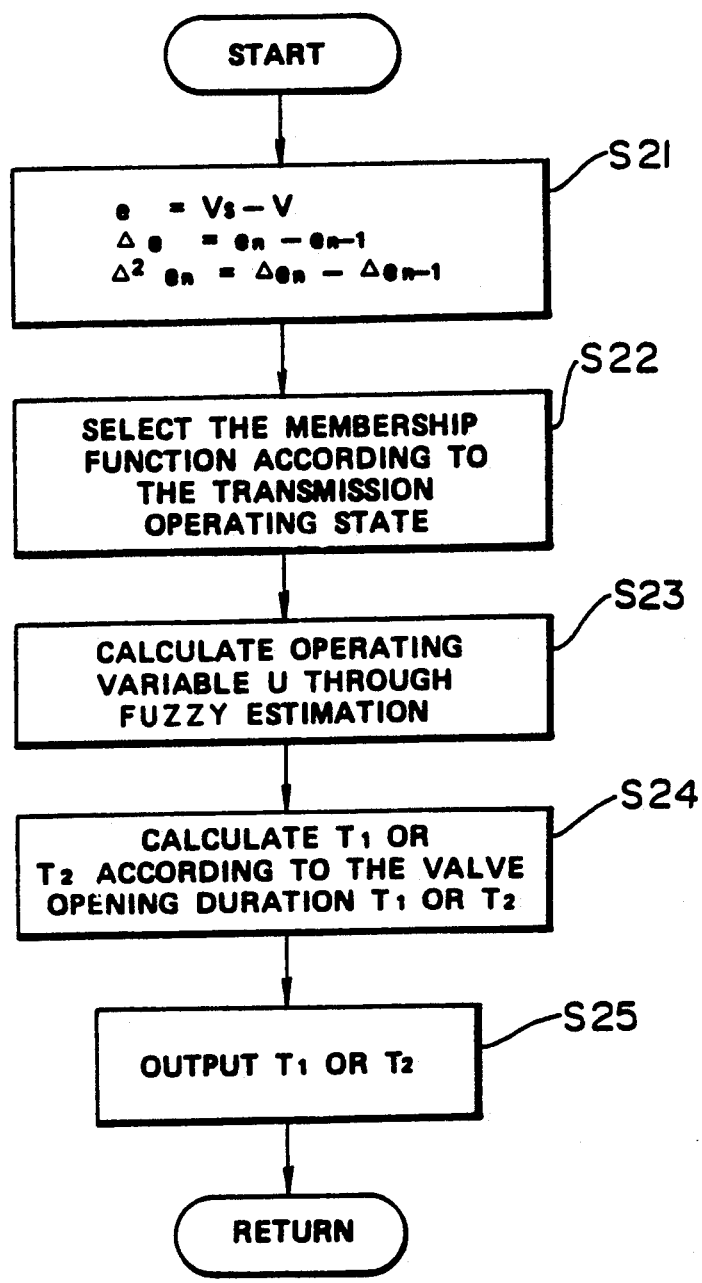
FIG. 12 is an operational flowchart of a cruising speed control routine executed in the second preferred embodiment shown in FIGS. 9 and 10.

FIG. 12 shows an operating flowchart of the cruising speed run control utilizing the fuzzy estimation according to the present invention carried out in the step SP14.

In a step S21, the control deviation $e_n$ ($=V_s-v$), first-order difference value $\Delta e_n$ ($=e_n-e_{n-1}$), and second-order difference value $\Delta^2 e_n$ ($=\Delta e_n-\Delta e_{n-1}$) are calculated.

In the next step S22, the control variables are set through the fuzzy estimation according to the transmission operating state determined by the signal indicating the presence or absence of the lock-up state read from the lock-up sensor 10 and gear position signal MP read from the gear position sensor 9. At this time, appropriate membership functions are selected and set from the membership function group stored in the memory.

Figure 13:
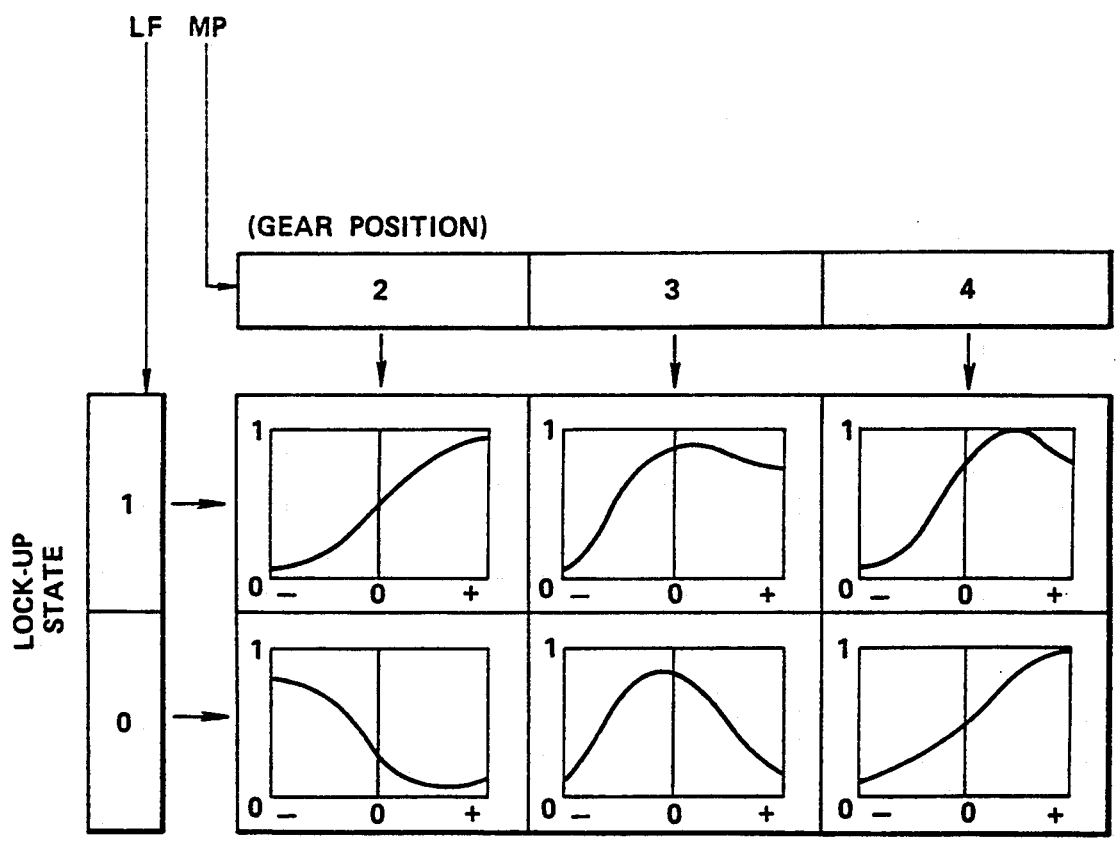
FIG. 13 is a series of graphs indicating membership functions stored in a memory in the second preferred embodiment shown in FIGS. 9 and 10.

Specifically, as shown in FIG. 13, numeric tables corresponding to the membership functions are stored into addresses specified by the gear positions (2-speed, 3-speed, and 4-speed) and present or absence of the lock-up position (presence 1; absence 0). The membership functions are retrieved according to the specified addresses.

In this case, the memory storing the membership function and retrieving function in the step SP 22 is equivalent to the membership setting unit f.

It is noted that the membership functions are generated through an interpolation and/or extrapolation with the reduction of data stored in the tables shown in FIG. 13.

As an alternative, with the membership functions expressed by the particular numerical equations, the membership functions are generated by extracting the constants such as those incorporated in linear function or Tan$^{-1}$ × from the memory that stores the constants, In the next step SP25, the control signal is outputted to the supply valve 34 or air valve 35 so that these valves are opened for the duration T1 or T2 set in the step SP23, respectively.

The function of the step SP25, corresponds to the controlling unit g.

The fuzzy estimation has been described in the step S16 of FIG. 5. However, the fuzzy estimation carried out in the step S23 will again be described below with reference to FIGS. 14(a) to 14(e).

The membership function is, e.g., set in the following equation which empirically indicates the certainty (fuzzy quantity) of the proposition Ii (i=1 to 3). (Refer to the solid line of FIG. 14(a).)

$$Pi(ei) = 1/\pi \; \text{Tan}^{-1}(Ciei) + 0.5 \qquad (1)$$

The membership function indicating the certainty of proposition IIi (i=1 to 3) is set in the following equation. (Refer to a broken line of FIG. 14(a).)

$$Ni(ei) = 1/\pi \, \mathrm{Tan}^{-1}(-Ciei) + 0.5 \qquad (2)$$

Then, the output membership function is set in the following equation which corresponds to the certainty that the manipulated variable U corresponding to the proposition Ii and the operating variable U should be positive.

$$Pui(U) = diU + 0.5$$

In addition, the output membership function is set in the following function which corresponds to the proposition IIi.

$$Nui(U) = -diU + 0.5$$

If a truth value of a value of the output membership function with respect to the value of the input membership function is $\gamma$, the following equations are set for propositions Ii and IIi:

$$Pi(ei) + \gamma - 1 = Pui(U)$$

$$Ni(ei) + \gamma - 1 = Nui(U)$$

It is noted that as the truth value becomes large, the control effect for the proposition is large.

With the truth value $\gamma$ of the proposition that the manipulated variable U (unknown) is when the input variable ei (known) is the longitudinal axis and manipulated variable U being the lateral axis, the drawing is carried out for each proposition. The result is shown in FIG 7.

The other processing of the fuzzy estimation has already described in the first preferred embodiment.

The action in which the membership functions are selected according to the transmission operating state which are essential requirements of the present invention.

As the gear position approaches a top gear position (four-speed position) and when the transmission is at the lock-up state at the same gear position, the change rate of the engine speed becomes large for the opening angle change range of the throttle valve 2, i.e., the gain in the vehicle system is large.

The characteristics of engine speed versus the engine torque with the opening angle of the throttle valve 2 of the engine being set as a parameter are shown in FIGS. 9(a) and 9(b).

Figure 15A:
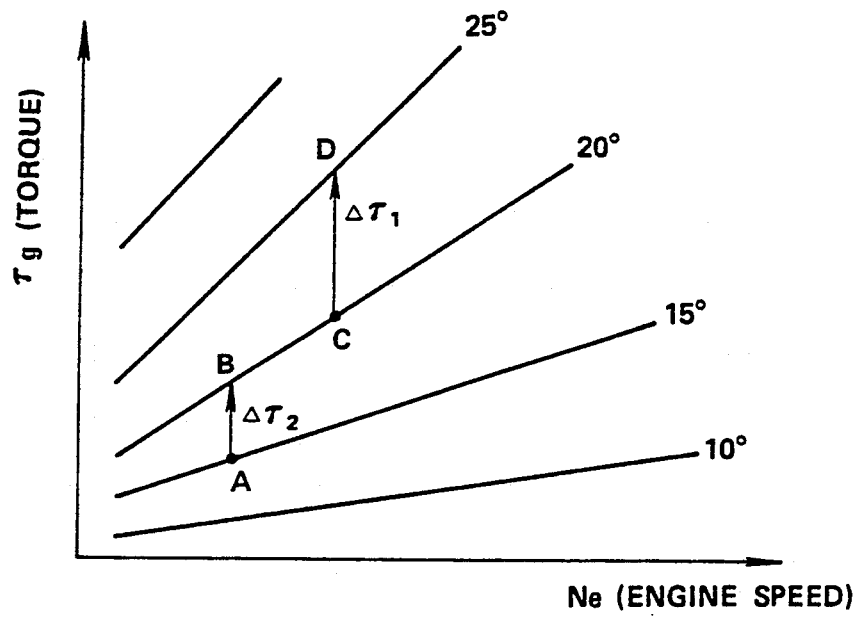
FIGS. 15(a) and 15(b) are graphs indicating an engine revolution speed verses engine torque with different opening angles of a throttle valve being parameters.

At a point A of FIG. 15(a), the vehicle runs at the cruising speed of 90 Km/h with the four-speed, lock-up state, and through the opening angle of 10 degrees. Then, suppose that the increase of torque when the throttle valve opening angle is changed by 5 degrees is transferred to point B by $\Delta \pi_1$. On the other hand, since the vehicle speed is reduced when the vehicle goes up at 90 Km/h, the opening angle of the throttle valve 2 is increased with the transmission shifted down so that the vehicle speed control maintaining the vehicle speed is carried out.

In this case, suppose that the increase of the torque when the opening angle of the torque is increased by 5 degrees (point D) indicates $\Delta \pi_2$. In the engine having the characteristic shown in FIG. 15(a), the magnitude of the increase in the engine torque is expressed as $\Delta \pi_1 < \Delta \pi_2$.

That is to say, the gain of the vehicle system is more highly increased when the shift down operation of the vehicular transmission is carried out.

Hence, the membership function in this case reduces the gain of the vehicle system. Specifically, if the vehicular transmission is shifted down from the four-speed, lock-up state to the three-speed, lock-up state, the fuzzy quantity in the vicinity of the target vehicle speed (in the vicinity of control deviation of 0) is set, as shown in the solid line of FIG. 14(b) lower than that shown by the solid line of FIG. 14(a), thus the gain of the control system can be reduced.

On the other hand, if the control deviation is positively large, i.e., the fuzzy quantity when the actual vehicle speed becomes largely delayed with respect to the target vehicle speed is reduced by the increase of the gain in the vehicle system.

Figure 14A:
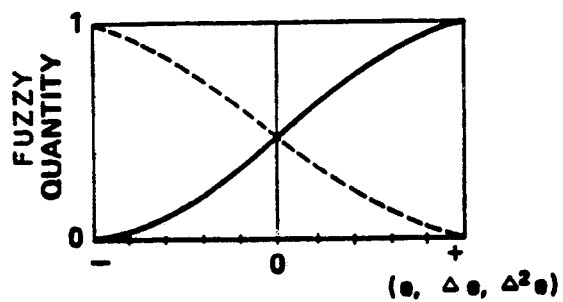
FIGS. 14(a) and 14(e) are graphs indicating membership functions set according to a variety of shift operation states in the vehicular transmission.
Figure 14D:
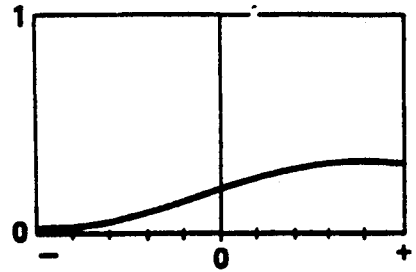
Figure 14B:
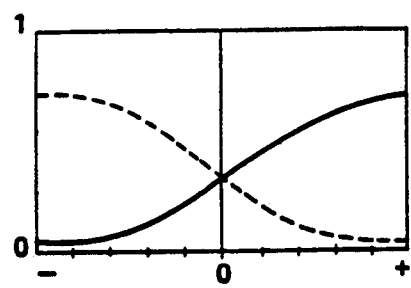

If the control deviation is negatively large, i.e., the deceleration is carried out when the actual vehicle speed is largely fast with respect to the target vehicle speed, the rate of deceleration (a reduction of speed per unit time) is large so that the fuzzy quantity is reduced (refer to a dotted line of FIG. 14(b)).

Figure 14E:
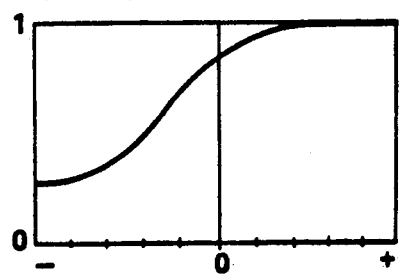
Figure 14C:
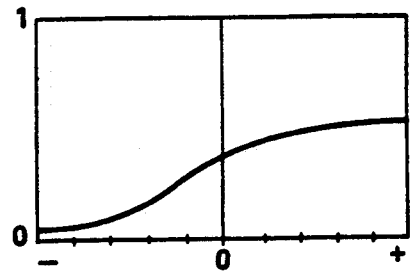

FIG. 14(c) shows the membership function in the three-speed, lock-up state. FIG. 14(d) shows the membership function in the two-speed, lock-up state.

The fuzzy quantity is set smaller as the gain of the vehicle system becomes large as the gain of the vehicle system becomes large, as shown in FIGS. 14(c) and 14(d).

Figure 15B:
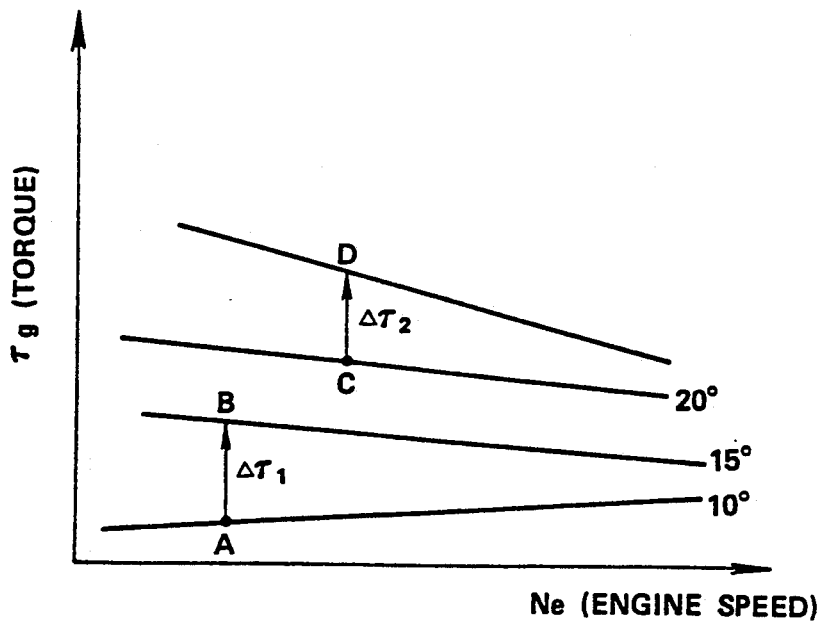

In the engine having a characteristic as shown in FIG. 15(b), the gain of the vehicular system is reduced through a shift down when $\Delta \pi_1 > \Delta \pi_2$ in the same proposition.

In this case, the fuzzy quantity of the membership function is increased to increase the gain of the control system in the case where the transmission operating state which reduces the gain of the vehicle system.

For example, the membership function in the transmission operating state shifted down from the transmission operating state in which the same membership function as shown in FIG. 14(a) is set as shown in FIG. 14(e).

FIG. 16(a) shows a motion of characteristic of the vehicle speed when the cruising speed control is carried out using the membership function set according to the transmission operating state as described above.

FIG. 16(b) shows the motion of characteristic of the vehicle speed when the cruising speed control is carried out using the constant membership function irrespective of the transmission operating state.

It is noted that in the cases as shown in FIGS. 16(a) and 16(b) the vehicle runs on an ascending slope at a gradient of 3% for 30 seconds after the travel of flat road for 5 seconds and thereafter again runs on the flat road.

As appreciated from FIGS. 16(a) and 16(b), the fluctuations of the vehicle speed in the former case is smaller than those in the latter case.

Figure 17A:
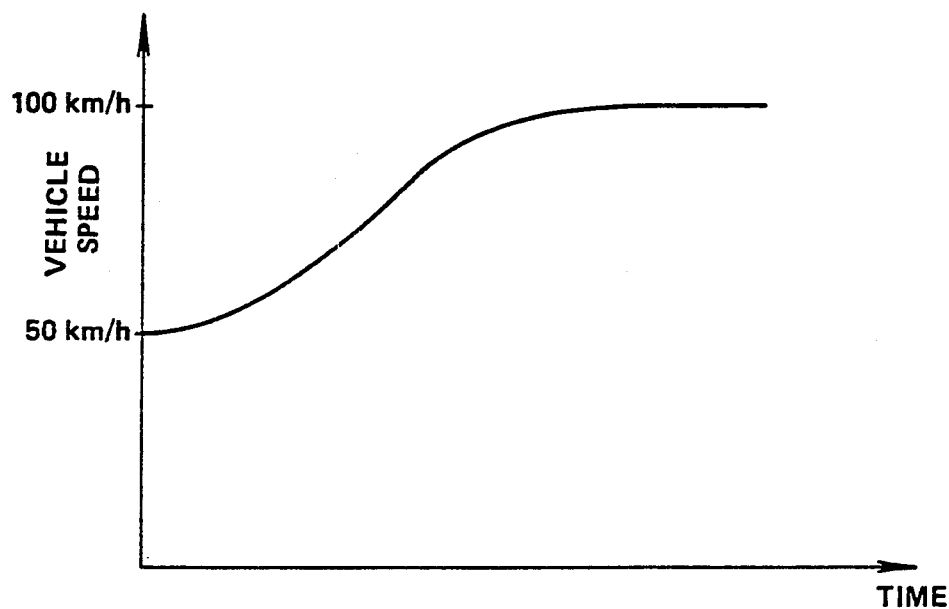
FIG. 17(a) is a timing chart of the vehicle speed in a case when the fuzzy estimation control method according to the present invention is used with the membership function fixed during the acceleration operation.

FIG. 17(a) shows the vehicle speed characteristic when the membership function is switched according to the transmission operating state in a case when the opening angle of the throttle valve is controlled through the fuzzy estimation to carry out the acceleration control from the vehicle speed of 50 Km/h to the target vehicle speed of 100 Km/h during the resume operation.

Figure 17B:
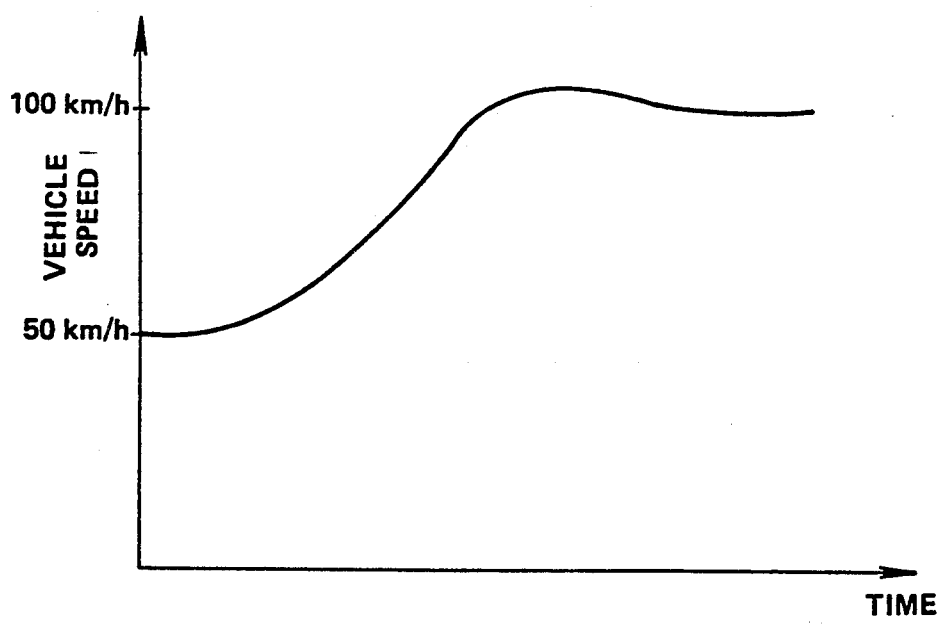
FIG. 17(b) is a timing chart of the vehicle speeding a case when the fuzzy estimation control method is used with the membership function fixed during the acceleration.
Figure 18A:
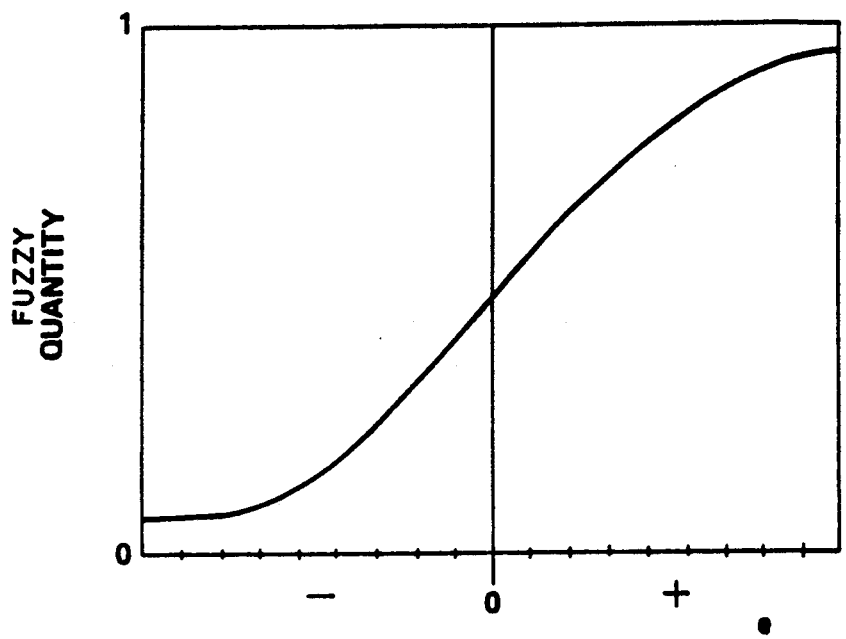
FIG. 18(a) is a graph of membership functions during large vehicle total weight in the second preferred embodiment according to the present invention.
Figure 18B:
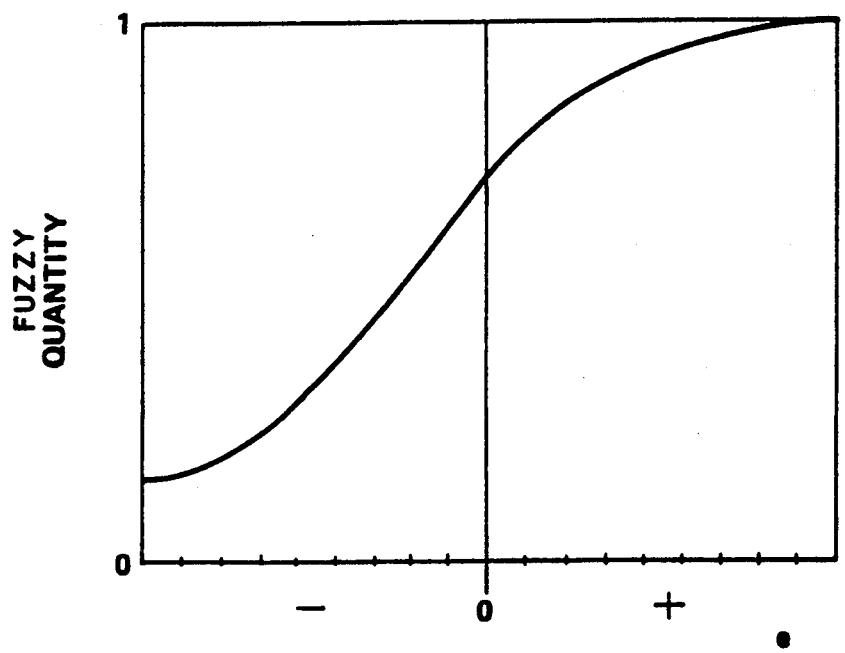
FIG. 18(b) is a graph of membership functions during small vehicle total weight in the second preferred embodiment.

As compared with FIG. 17(b) which shows the same vehicle speed characteristic in which the membership function is fixed, an overshooting of the vehicle speed can be suppressed to achieve a stable acceleration feeling as shown in FIG. 17(a).

In addition to the transmission operating state, a gradient of a vehicular axis with respect to a gravity and vehicle weight are also detected and with these kinds of information taken into account, the characteristic of the vehicle system is generally grasped so that the appropriate membership function may be set. In this case, a more accurate and stable vehicle speed characteristic can be achieved.

For example, when the total weight of the vehicle is measured and number of vehicle occupants are many (e.g., five persons ride the vehicle) and the total vehicle weight becomes heavy, the gain of the vehicle system is reduced due to a large inertia generated by the heavy total weight. In this case, the membership function is switched from the case shown in FIG. 18(a) in which the number of vehicle occupants is less (e.g., two persons, thus the vehicle total weight is light) to the case shown in FIG. 18(b) in which the fuzzy quantity is increased in order to increase the gain of the control system.

In this way, the stable cruising speed control can be achieved in which the control characteristic is not dependent upon such disturbances as the ascending slope on which the vehicle runs by setting the membership function which corresponds to the vehicle running resistance.

As described above, in the second preferred embodiment, the fuzzy estimation is carried out using the membership function set on the basis of the transmission operating state governing the responsive characteristic of the vehicle system and the cruising speed control is carried out through the fuzzy estimation.

Therefore, a stable cruising speed control can be achieved irrespective of the external disturbance such as the case of ascending slope run by the setting of the membership function corresponding to the vehicle running resistance so that the driveability and comfortability of the vehicle can remarkably be improved.

As described hereinabove, the system and method for automatically controlling the vehicle speed to the desired cruising speed according to the present invention sets the membership function in the fuzzy estimation on the basis of the vehicle driving characteristic such as operating state of the transmission, vehicle speed at the time of start of the resume operation and the target cruising speed when the fuzzy estimation is carried out using the membership function to set the controlled variable of the actuator. Therefore, the comfortability of the vehicle can remarkably be increased without hunting of the vehicle speed and stable vehicle speed change can be achieved.

It will clearly be understood by those skilled in the art that the foregoing description is made in terms of the preferred embodiments and various changes and modifications may be made without departing the scope of the present invention which is to be defined by the appended claims.

What is claimed is:

1. A system for automatically controlling speed of a vehicle at a target cruise speed, comprising:
 (a) first means for detecting vehicle speed;
 (b) second means for setting said target vehicle cruise speed according to a driver's intention to cruise at said target cruise speed during a run of said vehicle, for storing said target cruise speed and for resuming current vehicle speed at said target cruise speed during a resume operation;
 (c) third means for controlling an engine output of said vehicle using a controlled variable so that vehicle speed coincides with said target cruise speed;
 (d) fourth means for setting a plurality of different membership functions in a fuzzy inference on the basis of vehicle speed at the time of setting by said second means and on the basis of said target cruise speed set by said second means; and
 (e) fifth means for carrying out said fuzzy inference using said set plurality of membership functions so as to set said controlled variable of said third means, with said target cruise speed set by said second means and said vehicle speed detected by said first means as input information thereof to carry out said fuzzy inference.

2. A system for automatically controlling a vehicle speed to a target cruising speed, having an automatic cruising speed control mode comprising:
 (a) first means for detecting vehicle speed;
 (b) second means for setting said target cruising speed on the basis of a vehicle driver'intention;
 (c) third means for controlling an engine output using a controlled variable so that said vehicle speed detected by said first means coincides with said target cruising speed;
 (d) fourth means for deriving a gear range operation state of a vehicular transmission connected to the engine;
 (e) fifth means for selecting and setting a membership function from among a plurality of different membership functions in fuzzy estimation on the basis of said derived gear range operation state; and
 (f) sixth means for carrying out said fuzzy estimation using membership function set by said fifth means to set said controlled variable of said third means, with said target cruising speed set by said second means and said vehicle speed detected by said first means as input information thereof.

3. A system as set forth in claim 2, wherein said fourth means includes seventh means for detecting a shift position of said vehicular transmission connected to said engine and eighth means for detecting whether said vehicular transmission is in a lock-up state.

4. A system as set forth in claim 3, wherein said fifth means selects and sets said membership function on the basis of said gear range operation state of said vehicular transmission detected by said seventh means and said eighth means.

5. A system as set forth in claim 4, wherein said third means comprises an actuator, connected to an engine throttle valve independently of a manual accelerator, for adjusting an opening angle of said throttle valve according to said controlled variable so that said vehicle speed coincides with said target cruising speed, said actuator including: a diaphragm linked to said throttle valve and operable for actuating said throttle valve according to a received air pressure;
 a pressurized-air supply valve for operatively supplying pressurized-air to said diaphragm when opened so that said diaphragm actuates said throttle valve in an open direction;

an air supply valve normally opened to the air for operatively closing said diaphragm; and an air release valve normally opened to the air for operatively closing said diaphragm.

6. A system as set forth in claim 5, wherein said sixth means calculates a control deviation, a first-order difference of said control deviation, and a second-order difference of said first-order difference from said vehicle speed detected by said first means and target cruising speed set by said second means and wherein said sixth means uses a first input-side membership function expressed as: $Pi(ei) = 1/\pi \text{ Tan}^{-1} (Ciei) + 0.5$, said first input-side membership function empirically representing a fuzzy quantity of a first proposition $I_i$ ($i = 1$ to 3) that a manipulated variable for said third means should be positive when said calculated control deviation, first-order difference, and second-order difference indicate positive, respectively, said sixth means uses a second input-side membership function expressed as: $Ni(ei) = 1/\pi \text{ Tan}^{-1} (-Ciei) + 0.5$, said second input-side membership function empirically representing the fuzzy estimation of a second proposition $II_i$ that a manipulated variable should be negative when said calculated control deviation, first-order difference, and second-order difference indicate negative, respectively, said sixth means uses a first output-side membership function expressed as: $Pui(U) = diU + 0.5$, said first output-side membership function representing the correspondence of said fuzzy quantity of said first proposition $I_i$ to a manipulated variable, said sixth means uses a second output-side membership function expressed as: $Nui(U) = -diU + 0.5$, said second output-side membership function representing the correspondence to said fuzzy quantity of the second proposition $II_i$ to a manipulated variable, the relationships between said first input-side and output-side membership functions and between said second input-side and output-side membership functions being expressed as:

$$Pi(ei) + \gamma - 1 = Pui(U)$$

$$Ni(ei) + \gamma - 1 = Nui(U)$$

, wherein $\gamma$ denotes a truth value of a value of said output-side membership function with respect to that of said input-side membership function, and said sixth means carries out each proposition $I_i$ and $II_i$ with said truth value $\gamma$ being taken as a longitudinal axis and a manipulated variable being taken as a lateral axis, values of manipulated variables at intersections between said first proposition $I_i$ and second proposition $II_i$ being derived as candidates for the optimum value of said manipulated variable for said third means.

7. A system as set forth in claim 6, wherein an intermediate value of said candidates is the optimum value of said manipulated variable for the third means.

8. A system as set forth in claim 6, wherein an average value of said candidates is the optimum value of said manipulated variable.

9. A system as set forth in claim 6, wherein a weighted means value of said candidates is the optimum value of said manipulated variable.

10. A system as set forth in claim 6, wherein the optimum value of said manipulated variable is determined by a set mode or median of each of said candidates.

11. A system as set forth in claim 6, wherein said fifth means selects and sets said first input-side membership function in such a way that said fuzzy quantity in a vicinity of zero control deviation is set lower than when said vehicular transmission is shifted down from a four-speed, lock-up state to a three-speed, lock-up state in a case where a speed gain of the vehicular system is increased as said vehicular transmission is shifted down.

12. A system as set forth in claim 11, wherein said fifth means selects and sets said first input-side membership function in such a way that said fuzzy quantity is set lower by an amount corresponding to the increase of speed gain of the vehicular system when said calculated control deviation is positively large.

13. A system as set forth in claim 11, wherein said fifth means selects and sets said second input-side membership function in such a way that said fuzzy quantity is set lower by an amount corresponding to the increase of the speed gain of the vehicular system.

14. A system as set forth in claim 6, wherein said fifth means selects and sets said first input-side membership function in such a way that said fuzzy quantity in the vicinity of zero control deviation is set higher than that when said seventh and eighth means detects that said vehicular transmission is shifted down from a four-speed, lock-up state to a three-speed, lock-up state in a case where a speed gain of said vehicular system is decreased as said vehicular transmission is shifted down.

15. A system as set forth in claim 4, wherein said fourth means further comprises ninth means for detecting vehicle running resistance said fifth means selects and sets said membership function on the basis of the results of detection by said seventh, eighth, and ninth means.

16. A system as set forth in claim 2, wherein said second means included: seventh means for storing said target cruising speed when said automatic cruising speed control mode is cancelled; and eighth means for setting said stored speed as said target cruising speed in a resume operation of said system in which said vehicle speed is returned to said target speed and wherein said fourth means derives said target cruising speed set by said eighth means and derives said vehicle speed at a time when said resume operation is started and said fifth means selects and sets said membership function on the basis of said target cruising speed set by said eight means and said vehicle speed at the time of starting said resume operation derived by said fourth means.

17. A system as set forth in claim 16, wherein said fourth means derives a deviation between said target cruising speed set by said eighth means and said vehicle speed at the time of starting said resume operation and said fifth means selects and sets an input-side membership function whose parameter is selected according to a magnitude of deviation derived by said forth means and sets an output-side membership function through the use of a predetermined linear function.

18. A system as set forth in claim 17, wherein as a parameter ai of said input-side membership function is increased, a fuzzy quantity is decreased.

19. A system as set forth in claim 18, wherein said parameter ai is set in proportion to the magnitude of said deviation between said set cruising speed and said vehicle speed at said time of starting said resume operation.

20. A system as set forth in claim 17, wherein said fifth means selects and sets said input-side membership function according to the magnitude of said deviation and said vehicle speed at said time of starting said resume operation.

21. A system as set forth in claim 20, wherein a parameter ai of said input-side membership function becomes increased as said vehicle speed at said time of starting said resume operation in a case where an engine revolution speed becomes high and a speed gain of said vehicular system becomes high as said vehicle speed is increased.

22. An automatic cruise speed controlling system for automatically controlling speed of a vehicle at a target cruise speed, said vehicle having a vehicular system including a vehicular transmission comprising:
(a) first means for detecting vehicle speed;
(b) second means for setting said target cruise speed according to a vehicle driver's intention to cruise at said target cruise speed;
(c) third means for controlling engine output using a controlled variable on basis of a manipulated variable so that vehicle speed coincides with said target cruise speed;
(d) fourth means for deriving a gear range operation state of said vehicular system;
(e) fifth means for setting a membership function in a fuzzy estimation, said membership function being varied according to said gear range operation state of said vehicular system derived by said fourth means; and
(f) sixth means for carrying out said fuzzy estimation using said membership function set by said fifth means so as to set said controlled variable of said third means, with said target cruise speed set by said second means and said vehicle speed detected by said first means as input information thereof to carry out said fuzzy estimation.

23. A system as set forth in claim 22, wherein said fourth means derives said target cruise speed set by said second means and vehicle speed at a time of starting a resume operation of said automatic cruise speed controlling system in which vehicle speed is returned to said target cruise speed after said automatic cruise speed controlling system operation is cancelled and wherein said fifth means sets said membership function on the basis of said target cruise speed and vehicle speed at said time of the resume operation.

24. A system as set forth in claim 23, wherein said fourth means calculates a magnitude of deviation between said target cruise speed set by said second means and vehicle speed at said time of starting said resume operation and said fifth means sets an input-side membership function whose parameter ai (i=1 to 3) is selected according to said magnitude of deviation calculated by said fourth means and sets an output-side membership function using a linear function expressed as: $\frac{1}{2}$(bi)(y), wherein bi (i=1 to 3) denotes a constant parameter.

25. A system as set forth in claim 24, wherein said sixth means calculates control deviation $e_1$ between said vehicle speed detected by said first means and said target cruise speed set by said second means, first-order difference $e_2$ of the control deviation, and second-order difference $e_3$ of the said first-order difference, carries out said fuzzy estimation using said membership function set by said fifth means to calculate a manipulated variable of an actuator constituting said third means, said actuator including a diaphragm connected to an engine throttle valve for said third means, said actuator including a diaphragm connected to an engine throttle valve for actuating said throttle valve according to air pressure supplied via a normally opened air valve and a normally closed pressure-air supply valve, and sets said controlled variable of third means according to a positive or negative of said calculated manipulated variable and depending on which of said valves are operated, said controlled variable being an open duration of either of said two valves.

26. A system as set forth in claim 25, wherein a parameter ai (i=1 to 3) is set as follows: ai=$2\pi$/Ci, wherein said input-side membership function is expressed as follows:

$Pi(e_i)=1/\pi$ Tan$^{-1}$ $(Cie_i)+0.5$ and $Ni(e_i)=1/\pi$

Tan$^{-1}$ $(Cie_i)+0.5$ coefficient and $Pi(e_i)$ and $Ni(e_i)$ depends on whether the value of the control deviation is positive or negative and a parameter bi is set as follows:

$bi=\frac{1}{2}di$, wherein said output-side membership function is expressed as follows:

$Pui(U)=diU+0.5$ and $Nui(U)=-diU+0.5$.

27. A system as set forth in claim 26, wherein a parameter a1 corresponding to said calculated control deviation is set in proportion to said deviation between said target cruise speed and said vehicle speed at said time of starting said resume operation, a parameter a2 corresponding to said calculated first-order difference is set to be relatively large even when said deviation between said target is relatively smaller and is set smaller when said deviation between said target cruise speed and said vehicle speed at said time of starting said resume operation is relatively large, and a parameter a3 corresponding to said calculated second-order difference is three times as large as said parameter a2.

28. A system as set forth in claim 24, wherein said fifth means sets said input-side membership function whose parameter ai (i=1 to 3) is selected according to the magnitude of deviation between said target speed and said vehicle speed at said time of starting said resume operation and said vehicle speed at said time of starting said resume operation.

29. A system as set forth in claim 22, wherein said fourth means comprises seventh means for detecting an operation state of said vehicular transmission connected to an engine output.

30. A system as set forth in claim 29, wherein said membership function is set lower so as to reduce control gain of said automatic cruise speed controlling system in a case where said vehicular transmission is shifted down and a gain of said vehicular system is increased and said membership function is set higher so as to increase said control gain of said automatic cruising speed controlling system in a case where said transmission is shifted down and said gain of said vehicular system is reduced.

31. A method for automatically controlling speed of a vehicle at a target cruise speed said vehicle having a vehicular system and an automatic cruise speed control system, comprising the steps of:
(a) detecting vehicle speed;
(b) setting a current vehicle speed as said target cruise speed according to a vehicle driver's intention to cruise at said target cruise speed;
(c) deriving a static driving characteristic of said vehicular system;

(d) setting a membership function in a fuzzy estimation on the basis of said derived static driving characteristic of said vehicular system;

(e) carrying out the said fuzzy estimation using said set membership function so as to set a controlled variable, with said detected vehicle speed and said set target cruise speed as input information; and (f) controlling an engine output of said vehicle using said set controlled variable so that vehicle speed coincides with said target cruise speed.

32. A method as set forth in claim 31, wherein step (b) includes the steps of: (g) determining whether operation of said automatic cruise speed controlling system is cancelled; (h) storing said target cruise speed when said automatic cruise speed controlling system carries out cruise speed control upon the determination in step (g) that operation of said automatic cruise speed controlling system is cancelled; and (i) setting said stored target cruise speed as target cruise speed of a resume operation for said automatic cruise speed controlling system in which vehicle speed is returned to said set target cruise speed after cancellation of operation of said automatic cruise speed controlling system.

33. A method as set forth in claim 31, wherein said static driving characteristic of said vehicular system includes a shift operating state of a vehicular transmission.

34. A method as set forth in claim 32, wherein said resume operation of said vehicular system is on the basis of said target cruise speed and a vehicle speed at the time of starting said resume operation.

* * * * *